United States Patent [19]
Ito

[11] Patent Number: 5,164,859
[45] Date of Patent: Nov. 17, 1992

[54] ZOOM LENS SYSTEM FOR USE WITH A COMPACT CAMERA HAVING A WIDE COVERAGE OF ANGLES

[75] Inventor: Takayuki Ito, Tokyo, Japan

[73] Assignee: Asahi Kogaku Kogyo K.K., Tokyo, Japan

[21] Appl. No.: 617,245

[22] Filed: Nov. 21, 1990

[30] Foreign Application Priority Data

Nov. 21, 1989 [JP] Japan ................................ 1-302570
Dec. 5, 1989 [JP] Japan ................................ 1-315933

[51] Int. Cl.$^5$ ...................... G02B 15/14; G02B 13/18
[52] U.S. Cl. .................................... 359/692; 359/684; 359/708
[58] Field of Search ................ 359/684, 692, 689, 708

[56] References Cited

U.S. PATENT DOCUMENTS

| | | | |
|---|---|---|---|
| 3,918,798 | 11/1975 | Takano | 359/688 |
| 4,190,323 | 2/1980 | Ogawa et al. | 359/691 |
| 4,682,860 | 7/1987 | Tanaka et al. | 359/692 |
| 4,836,660 | 6/1989 | Ito | 359/692 |

FOREIGN PATENT DOCUMENTS

| | | |
|---|---|---|
| 56-128911 | 10/1981 | Japan . |
| 57-201213 | 12/1982 | Japan . |
| 60-48009 | 3/1985 | Japan . |
| 60-170816 | 9/1985 | Japan . |
| 60-191216 | 9/1985 | Japan . |
| 62-90611 | 4/1987 | Japan . |
| 62-113120 | 5/1987 | Japan . |
| 62-264019 | 11/1987 | Japan . |
| 63-276013 | 11/1988 | Japan . |
| 64-57222 | 3/1989 | Japan . |
| 1-189620 | 7/1989 | Japan . |

Primary Examiner—Scott J. Sugarman
Attorney, Agent, or Firm—Sughrue, Mion, Zinn, Macpeak & Seas

[57] ABSTRACT

In a zoom lens system for use with a compact camera having a wide coverage of angles that comprises, in order from the object side, a first lens group having a positive focal length and which performs zooming by changing the distance beween the first and second lens groups, the said first lens group comprises, in order from the object side, a front subgroup 1F having a positive focal length, a diaphragm stop and a positive rear subgroup 1R with a small power, and the first lens in the front subgroup 1F is a negative lens, with the specific conditions.

19 Claims, 22 Drawing Sheets

ZOOM LENS SYSTEM FOR USE WITH A COMPACT CAMERA HAVING A WIDE COVERAGE OF ANGLES

BACKGROUND OF THE INVENTION

This invention relates to a zoom lens system that is suitable for use with a compact camera and which is subject to less constraints on back focus than zoom lens systems for use with single-lens reflex cameras. More particularly, this invention relates to a compact zoom lens system of a structurally simple two-group telephoto type (hereinafter referred to simply as a "two-group type") which yet has a wide coverage of angles, i.e., ca. 37 degrees as half view angle, at the short focus end and which is capable of zooming up to a ratio of ca. 2.5 in consideration of its nature as a two-group type system having a wide coverage of angles. This invention also relates to a method of focusing with such a zoom lens system.

Conventional zoom lens systems for use with compact cameras are classified as two types, (A) a two-group type and (B) a three- or four-group type. Compared with type (A), zoom lens systems of type (B) have the advantage of requiring a relatively small amount of lens movement but, on the other hand, they are not only large in size but also complex in construction. Because of these obvious differences from lens systems of a two-group type which are envisaged by the present invention, type (B) will not be described in detail hereinafter.

Compared to type (B), zoom lens systems of type (A) require a somewhat greater amount of lens movement but because of their simple lens configuration and mechanical structure, type (A) zoom lens systems have the advantage of ease in size reduction. Conventionally known zoom lens systems of a two-group type include version (A-1) that is described in Unexamined Published Japanese Patent Application Nos. Sho-56-128911, Sho-57-201213, Sho-60-48009, Sho-60-170816 and Sho-60-191216, version (A-2) that is described in Unexamined Published Japanese Patent Application Nos. Sho-62-90611, and Sho-64-57222, and version (A-3) that is described in Unexamined Published Japanese Patent Application Nos. Sho-62-113120 and Sho-62-264019.

In the zoom lens system of the present invention, a negative lens element is used as the first lens and Unexamined Published Japanese Patent Application No. Sho-63-276013 describes a similar telephoto lens system of a two-group type in which a negative lens element is used as the first lens of the first group.

A method of focusing with such a two-group type zoom lens system is described in Unexamined Published Japanese Patent Application No. Hei-1-189620.

Version (A-1) has a small back focus and requires a large rear lens diameter, so it has had the problem that the overall size of the camera incorporating said lens system cannot be reduced. A further problem with this lens system is that internal reflections between the film plane and the last lens surface and other unwanted phenomena are highly likely to occur.

With a view to solving these problems, the assignee has proposed improved versions of a two-group type the back focus of which is comparatively large in consideration of its use with compact cameras. Such improved versions are (A-2) which is of a five-group-six-element composition and which is capable of a zoom ratio of 1.5–1.6 and (A-3) which is of a six-group-seven-element composition or seven-group-eight-element composition and which is capable of a zoom ratio on the order of 1.7–2.5. These versions range from a six-element composition capable of a zoom ratio of ca. 1.5–1.6 to an eight-element composition capable of a zoom ration of at least 2. However, they provide half view angle of only about 30 degrees at the short focus end and are chiefly intended to photograph scenery; in other words, they are short of satisfying the need to take pictures through wide angles with a compact camera. Further, those proposals have been unable to satisfy the need for providing a zoom lens system for use with a compact camera that is even more compact and less expensive.

The zoom lens system described in Unexamined Published Japanese Patent Application No. Sho-63-276013 uses a negative lens element as the first lens as in the present invention. However, this requires the use of lenses having a certain refractive index profile which are difficult to manufacture at low cost by the state-of-the-art technology. In addition, the half view angle that can be attained at the short focus end is no wider than 30 degrees.

SUMMARY OF THE INVENTION

According to the invention, in a zoom lens system for use with a compact camera having a wide coverage of angles that comprises, in order from the object side, a first lens group having a positive focal length and a second lens group having a negative focal length and which performs zooming by changing the distance between the first and second lens groups, the first lens group comprises, in order from the object side, a subgroup 1a having a negative focal length, and a subgroup 1b having a positive focal length, and the subgroup 1a include, in order from the object side, a negative first lens, a negative second lens and a positive third lens, with the following conditions being satisfied:

$$-0.8 < f_{1G}/f_1 < -0.1 \tag{1}$$

$$-1.5 < f_{1G}/f_{1,2} < -0.8 \tag{2}$$

$$1.2 < f_S/f_{1G} < 1.7 \tag{3}$$

where
  $f_{1G}$: the focal length of the first lens group;
  $f_1$: the focal length of the first lens;
  $f_{1,2}$: the composite focal length of the first and second lens in the subgroup 1a; and
  $f_S$: the focal length of the overall system at the wide-angle end.

The subgroup 1a has a aspherical surface having an aspheric amount of digergence relative to an paraxial radius of curvature, satisfying the following condition:

$$-20 < \Delta I_{1a} < 0 \tag{4}$$

where $\Delta I_{1a}$ is the change of a third order spherical aberration coefficient by aspherical surface within said subgroup 1a.

The first lens of the subgroup 1a is a negative lens having a large concave curvature toward the image side, the second lens of the subgroup 1a is a negative lens having a large concave curvature toward the object side, and the third lens of said subgroup 1a is a positive lens having a convex curvature toward the object side. The system further satisfies the following conditions:

$$-0.8 < f_{1G}/f_{1a} < 0 \qquad (5)$$

$$0.7 < r_2 f_S < 1.2 \qquad (6)$$

$$0.5 < |r_3|/f_S < 1.0 \ (r_3 < 0) \qquad (7)$$

$$0.8 < r_5/f_S < 5.0 \qquad (8)$$

$$0.07 < N_2 - N_3 \qquad (9)$$

$$7 < \nu_2 - \nu_3 \qquad (10)$$

where
$f_{1a}$: the focal length of the subgroup 1a;
$r_i$: the radius of curvature of an i-th lens surface from the object side;
$N_K$: the refractive index of a K-th lens at d-line; and
$\nu_K$: the Abbe number of the K-th lens.

The subgroup 1b includes a positive cemented lens composed of a biconvex lens 1b-a and a negative meniscus lens 1b-2, the cemented lens having a divergent surface on its cemented surface, the subgroup 1b further including a positive lens after said cemented lens.

The lens 1b-3 is adpheric and made of plastic, meeting the following conditions:

$$0 < \frac{f_{1G}}{f_{1b-3}} < 0.3 \qquad (11)$$

$$-30 < \Delta I_{1b-3} < 0 \qquad (12)$$

where $f_{1b-3}$ is the focal length of the lens 1b-3 and $\Delta I_{1b-3}$ is the change of the third order spherical aberration coefficient by the aspherical surface of the lens 1b-3.

The second lens group comprises, in order from the object side, a positive meniscus lens having a convex surface directed toward the image and two negative lens elements each having a concave surface directed toward the object, with the following condition being satisfied:

$$1.7 < \overline{N_{2Gn}} \qquad (13)$$

$\overline{N_{2Gn}}$: the average of the refractive indices at the d-line of the two negative lens elements in the second lens group.

According to one aspect of the invention, a zoom lens system for use with a compact camera with a wide coverage of angles, comprises, in order from the object side, a first lens group having a positive focal length and a second lens group having a negative focal length and which performs zooming by changing the distance between the first and second lens group. A diaphragm stop is disposed after the first lens group and a fixed aperture stop is further disposed after the first-mentioned stop, said fixed stop is moved together with the first lens group in zooming and is fixed away from the first lens group in focusing, further satisfying the condition:

$$0.03 < \frac{d_X}{f_S} < 0.15 \qquad (14)$$

where $d_x$ is the distance between a rear end of the first lens and the fixed stop and $f_S$ is the overall focal length of the system at a wide angle end.

The zoom lens system according to still another aspect of the present invention which is to be used with a compact camera having a wide coverage of angles comprises basically, in order from the object side, a first lens group having a positive focal length and a second lens group having a negative focal length and performs zooming by changing the distance between the first and second lens groups. In the broadest scope of the present invention, said first lens group comprises, in order from the object side, a front subgroup 1F having a positive focal length, a diaphragm stop, and a positive rear subgroup 1R with a small power, and the first lens in the front subgroup 1F is a negative lens, with the following conditions being satisfied:

$$-0.8 < f_{1G}/f_1 < -0.1 \qquad (1)$$

$$-0.5 < f_{1G}/f_{1R} < 0.35 \qquad (15)$$

$$1.2 < f_S/f_{1G} < 1.7 \qquad (3)$$

$$0.03 < d_{1F-1R}/f_S < 0.15 \qquad (16)$$

where
$f_{1G}$: the focal length of the first lens;
$f_1$: the focal length of the rear subgroup 1R;
$f_{1R}$: the focal length of the rear subgroup 1R;
$f_S$: the focal length of the overall system at the wide-angle end; and
$d_{1F-1R}$: the distance between the subgroups 1F and 1R for an infinitely distant object.

In one embodiment, the front subgroup 1f comprises, in order from the object side, a first lens unit 1a composed of at least three lens elements including two negative lenses (the first and second lenses) and a positive lens, and a second lens unit 1b having a strong positive power, and the following additional conditions are satisfied:

$$-1.5 < f_{1G}/f_{1,2} < -0.8 \qquad (17)$$

$$0.6 < f_{1G}/f_{1b} < 0.9 \qquad (18)$$

where
$f_{1,2}$: the composite focal length of the first and second lenses; and
$f_{1b}$: the focal distance of the second lens unit 1b.

In another embodiment, the first lens unit 1a comprises, in order from the object side, a negative first lens having a concave surface of large curvature directed toward the image, a negative second lens having a concave surface of large curvature directed toward the object, and a positive lens having a convex surface directed toward the object.

In still another embodiment, the second lens unit 1b comprises a biconvex positive lens having a divergent cemented surface and a negative meniscus lens.

In yet another embodiment, the first lens unit 1a has at least one aspheric surface that has a divergent amount of asphericity with respect to a paraxial radius of curvature in such a way as to satisfy the following condition:

$$-20 < \Delta I_{1a} < 0 \qquad (4)$$

where
$\Delta I_{1a}$: the amount of change in the coefficient of a third-order spherical aberration caused by the aspheric surface in the first lens unit 1a.

In a further embodiment, the rear subgroup 1R is solely composed of a single plastic positive meniscus lens element having a convex surface directed toward the image, and the following conditions are satisfied:

$$-0.5 < f_{1G}/f_{1R} < 0.35 \quad (15)$$

$$(m_{2L} - m_{1R} \cdot m_{2L})^2 < 0.8 \quad (19)$$

where
  $m_{2L}$: the lateral magnification of the second lens group at the narrow-angle end; and
  $m_{1R}$: the lateral magnification of the rear subgroup 1R.

In a still further embodiment, the rear subgroup 1r has at least one aspheric surface that has a divergent amount of asphericity with respect to a paraxial radius of curvature in such a way as to satisfy the following condition:

$$-20 < \Delta I_{1R} < 0 \quad (20)$$

where
  $\Delta I_{1R}$: the amount of change in the coefficient of a third-order spherical aberration caused by the aspheric surface in the rear subgroup 1R.

In yet another embodiment, the second lens group comprises, in order from the object side, a positive meniscus lens having a convex surface directed toward the image and two negative lens elements each having a concave surface directed toward the object, and satisfies the following condition:

$$1.7 < \overline{N_{2Gn}} \quad (13)$$

where
  $\overline{N_{2Gn}}$: the average of the refractive indices at the d-line of the two negative lens elements in the second lens group.

The method of focusing with a zoom lens system according to the second aspect of the present invention is basically directed to a zoom lens system that comprises, in order from the object side, a first lens group having a positive focal length and a second lens group having a negative focal length and which performs zooming by changing the distance between the first and second lens groups. In the broadest scope of this aspect of the invention, said first lens group comprises, in order from the object side, a front subgroup 1F having a positive focal length, a diaphragm stop, and a positive rear subgroup 1R with a small power, and the first lens in the front subgroup 1F is a negative lens, and focusing is achieved by moving the first lens group toward the object with the distance between the front subgroup 1F and the rear subgroup 1R being increased while satisfying the following conditions:

$$-0.8 < f_{1G}/f_1 < -0.1 \quad (1)$$

$$0.05 < f_{1G}/f_{1R} < 0.35 \quad (15)$$

$$0 \leq \frac{X_{1R}}{X_{1F}} < 0.7 \quad (21)$$

where
  $X_{1R}$: the amount of movement of the rear subgroup 1R during focusing; and
  $X_{1F}$: the amount of movement of the front subgroup 1F during focusing.

In one embodiment, the rear subgroup 1R is solely composed of a single plastic positive meniscus lens element having a convex surface directed toward the image, and focusing is achieved by moving the first lens group toward the object with the distance between the front subgroup 1F and the rear subgroup 1R being increased while satisfying the following conditions:

$$0.05 < f_{1G}/f_{1R} < 0.35 \quad (15)$$

$$(m_{2L} - m_{1R} \cdot m_{2L})^2 < 0.8 \quad (19)$$

$$0 \leq \frac{X_{1R}}{X_{1F}} < 0.7 \quad (21)$$

In another embodiment, focusing is performed with both the diaphragm stop and the rear subgroup 1R being fixed.

DETAILED DESCRIPTION OF THE CONDITIONS

Figure 1:
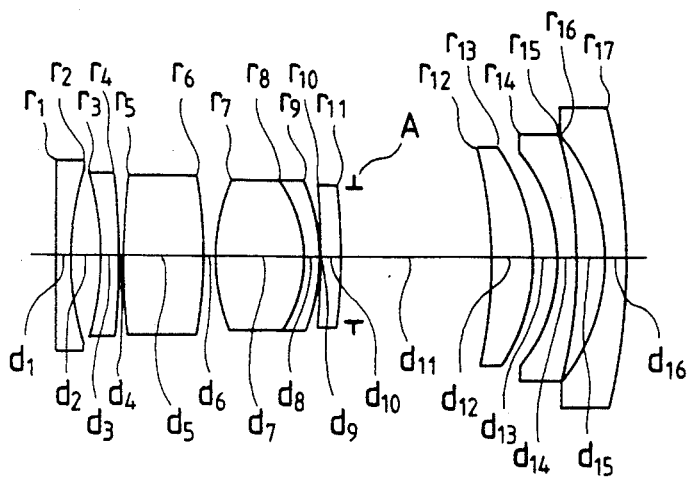
FIGS. 1, 3, 5 and 7 are diagrams showing lens systems at the short focal length side according to first through fourth examples of the present invention.
Figure 2A:
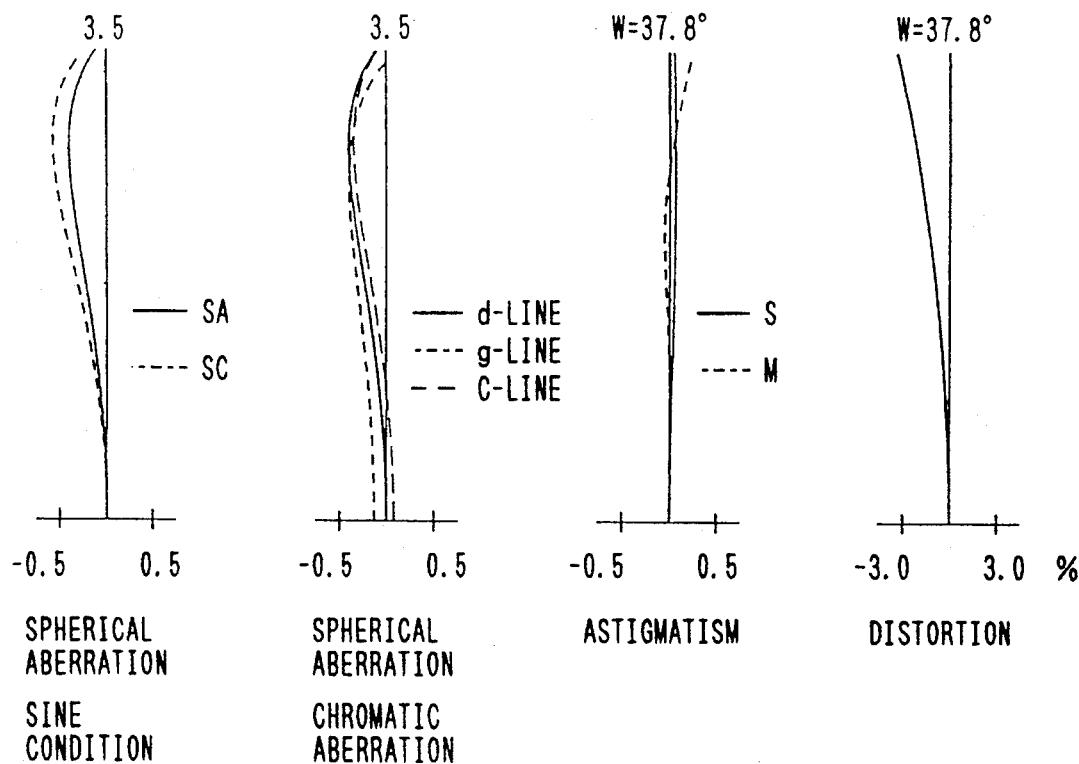
FIGS. 2, 4, 6 and 8 are graphs plotting the aberration curves obtained with the lens systems according to the first through fourth examples shown in FIGS. 1, 3, 5 and 7, respectively, with (a) showing the state at the wide-angle end (b), the middle-angle angle end, and (c), the narrow-angle end.
Figure 2B:
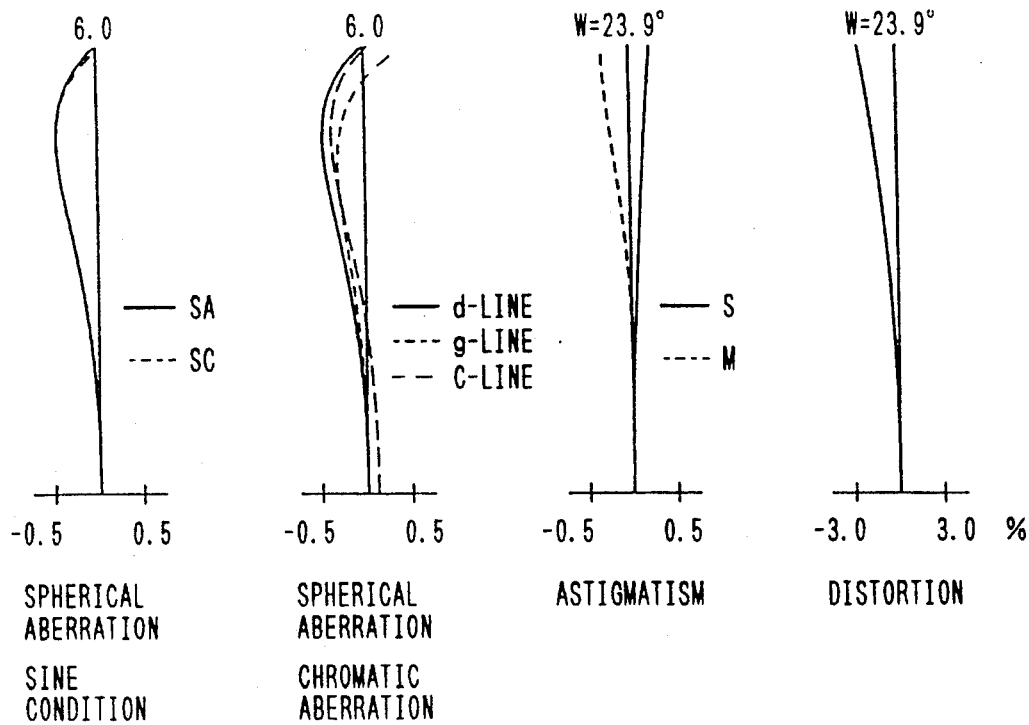
Figure 2C:
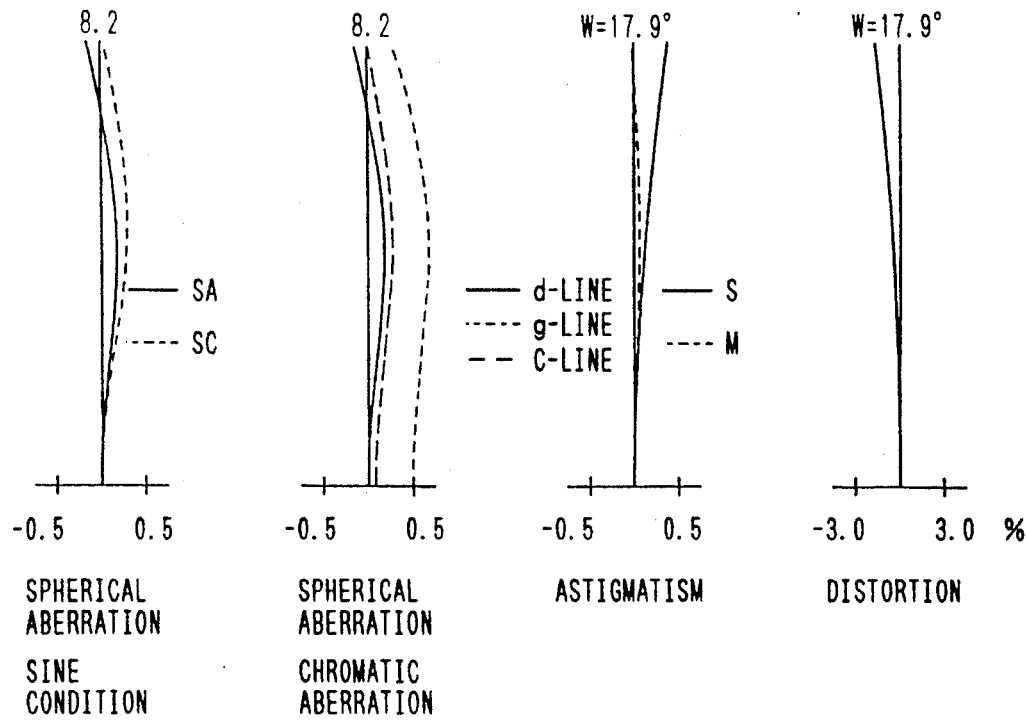
Figure 3:
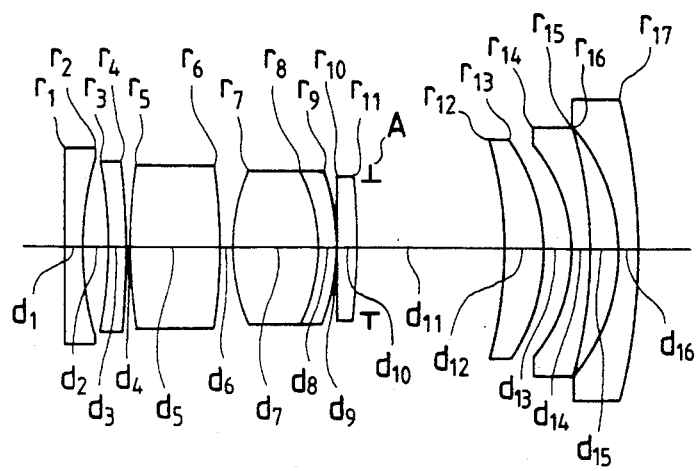
Figure 4A:
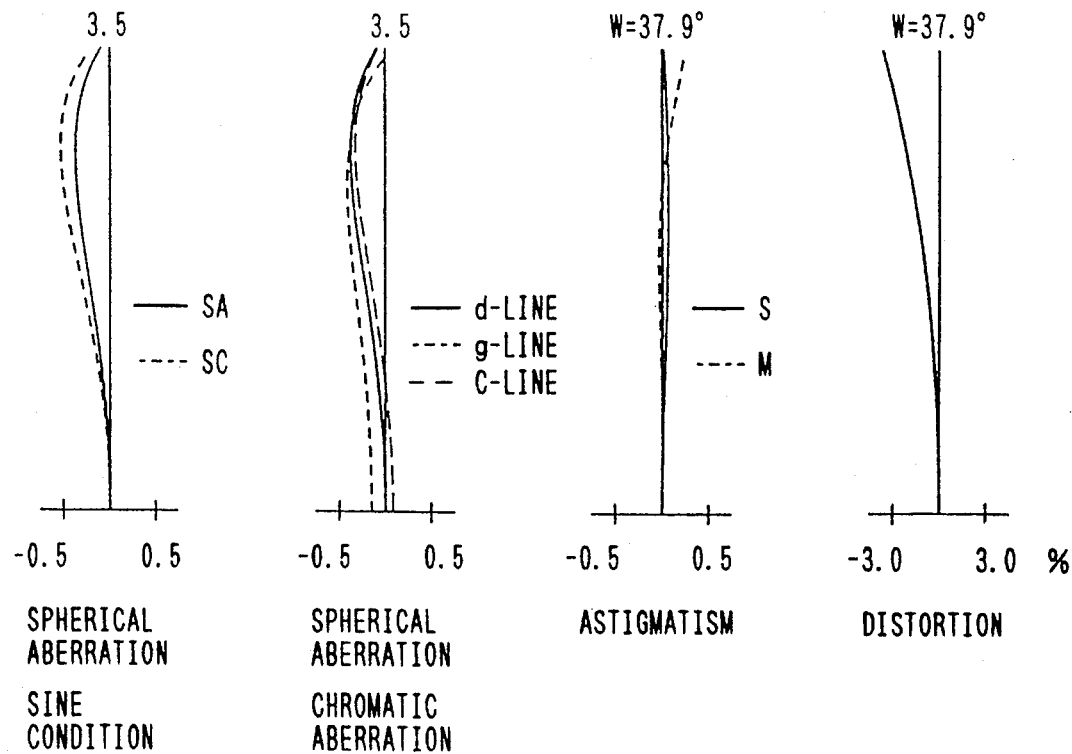
Figure 4B:
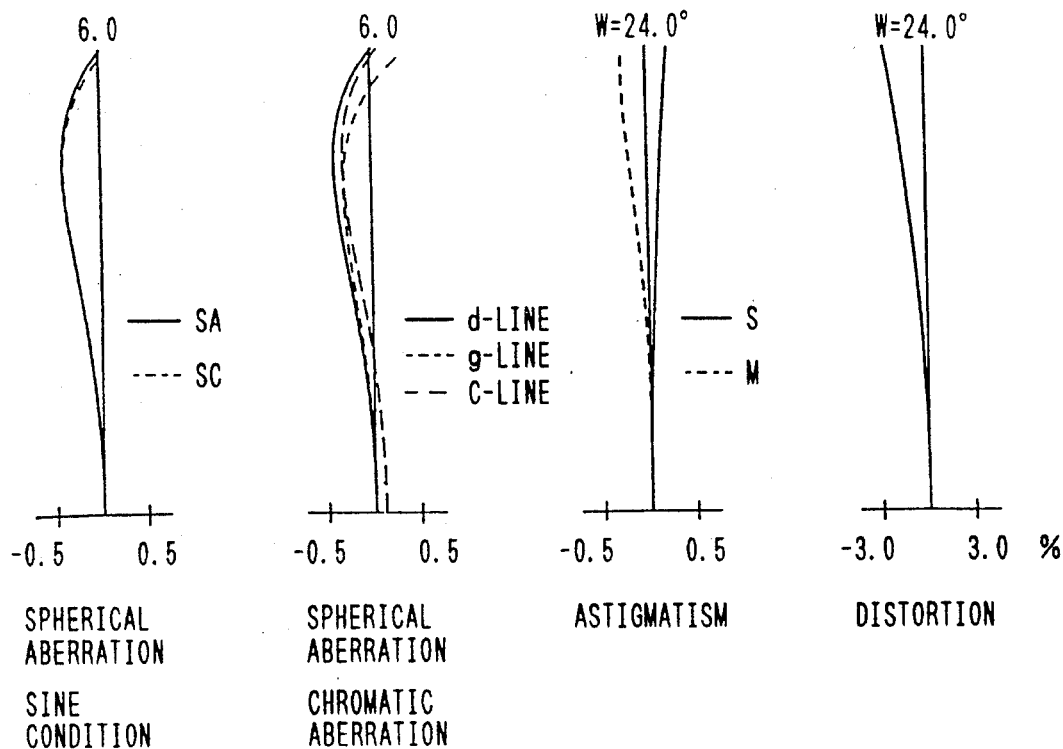
Figure 4C:
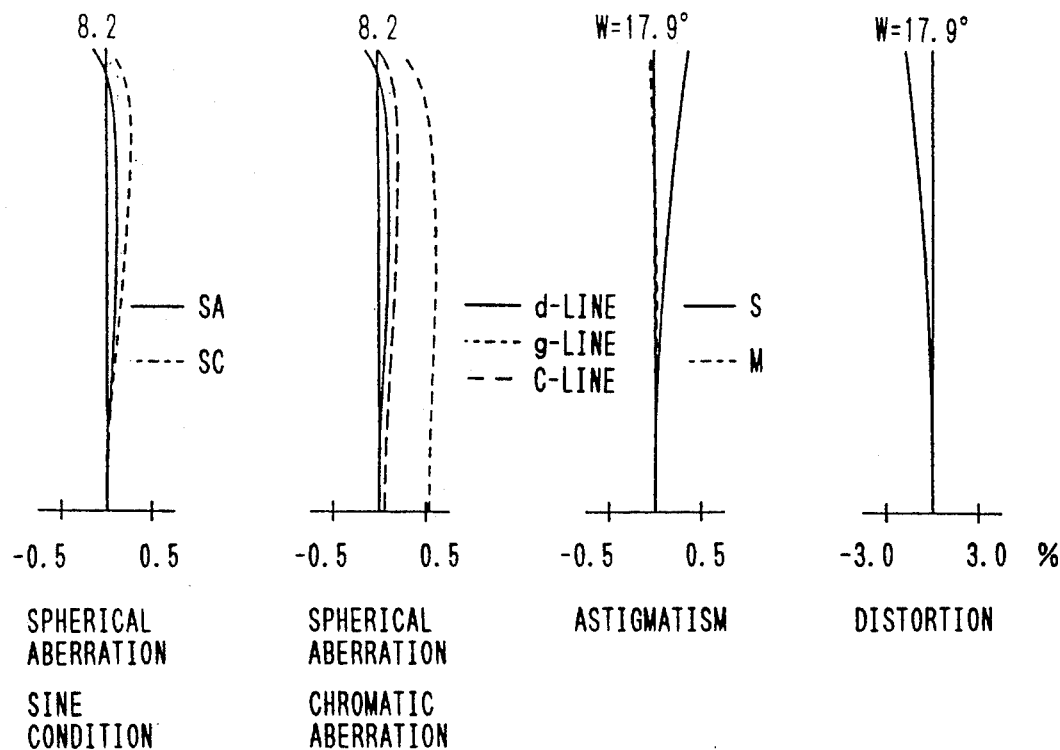
Figure 5:
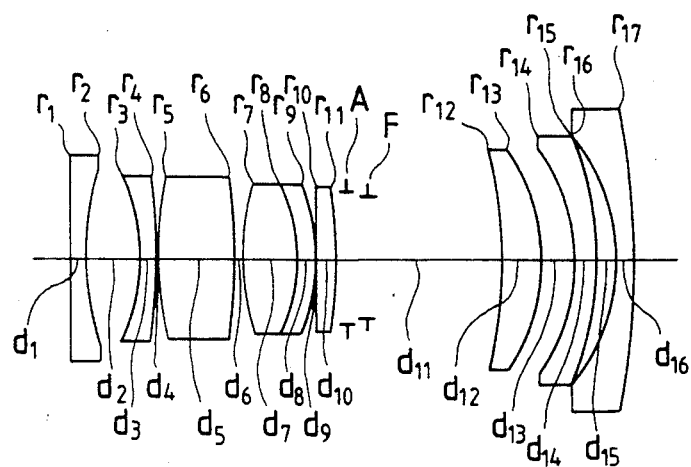
Figure 6A:
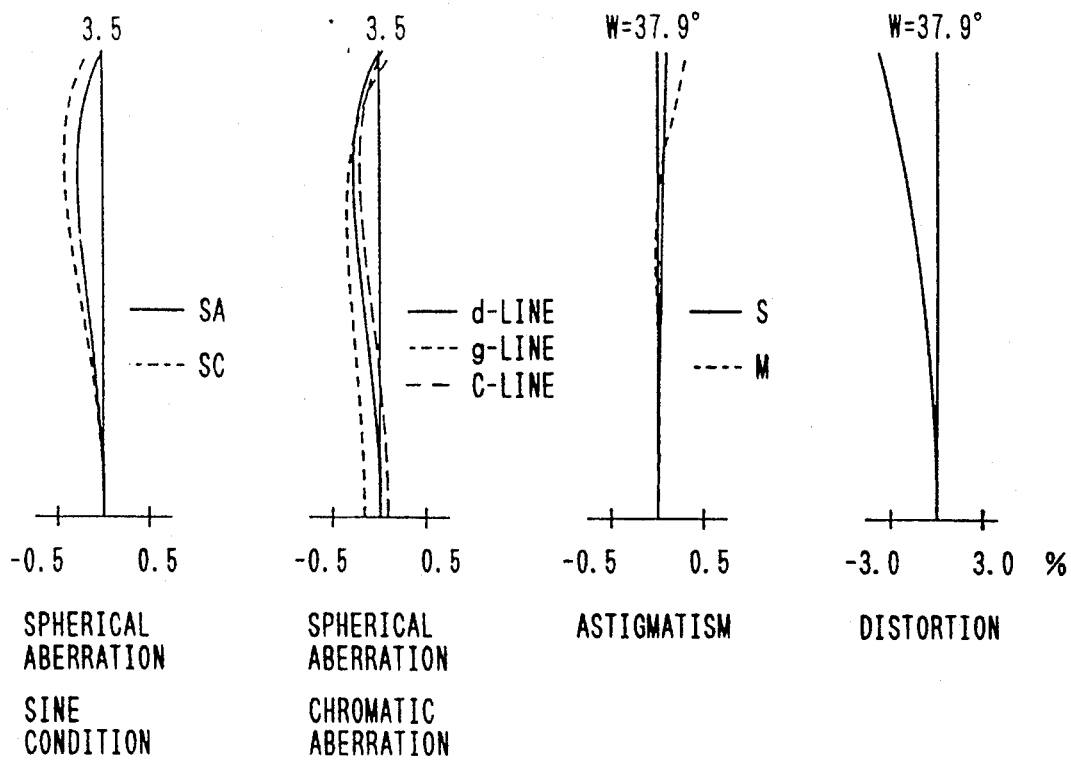
Figure 6B:
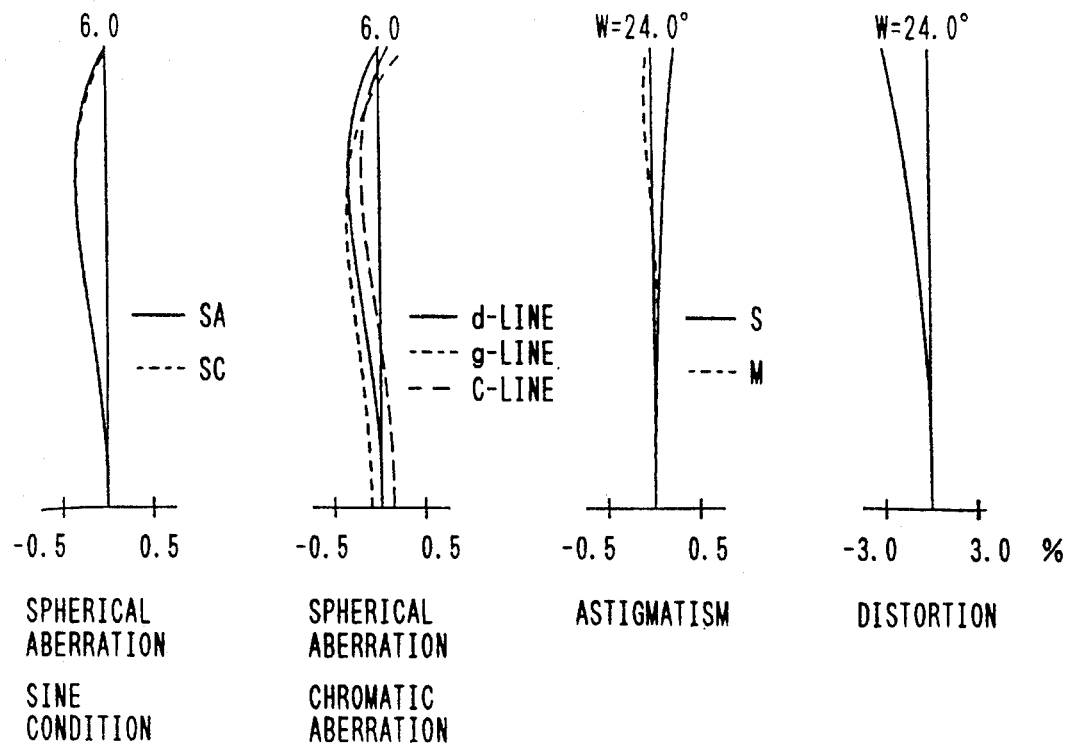
Figure 6C:
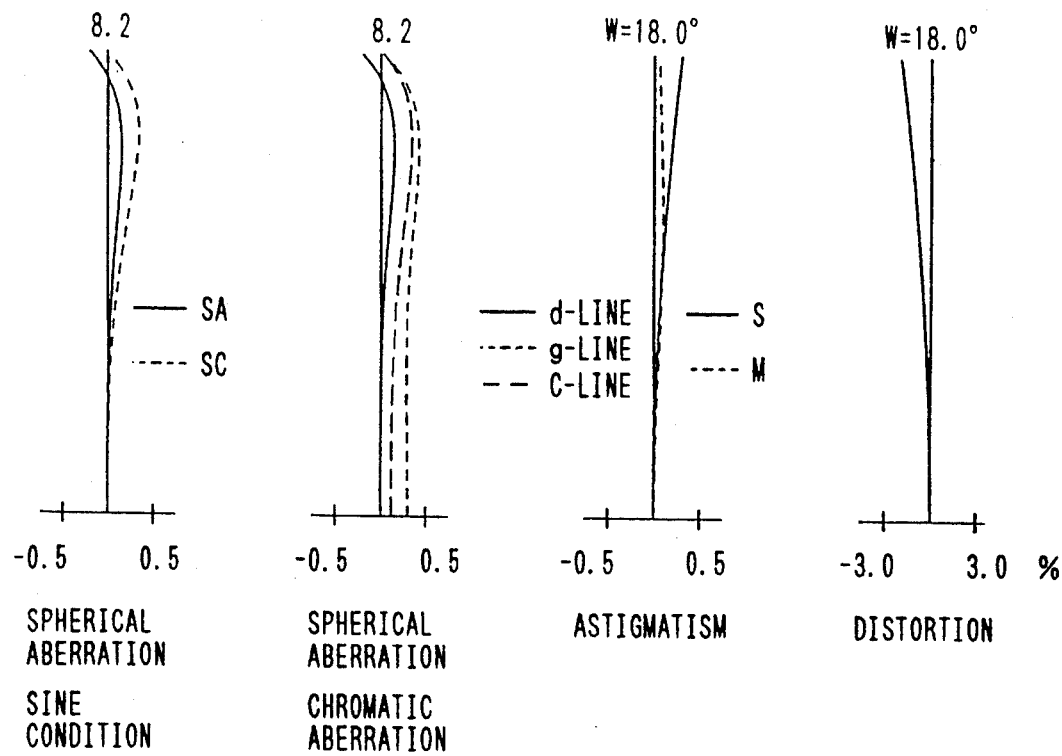
Figure 7:
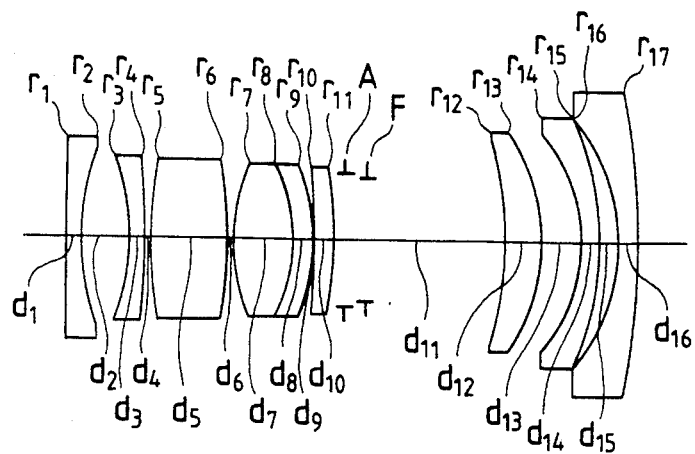
Figure 8A:
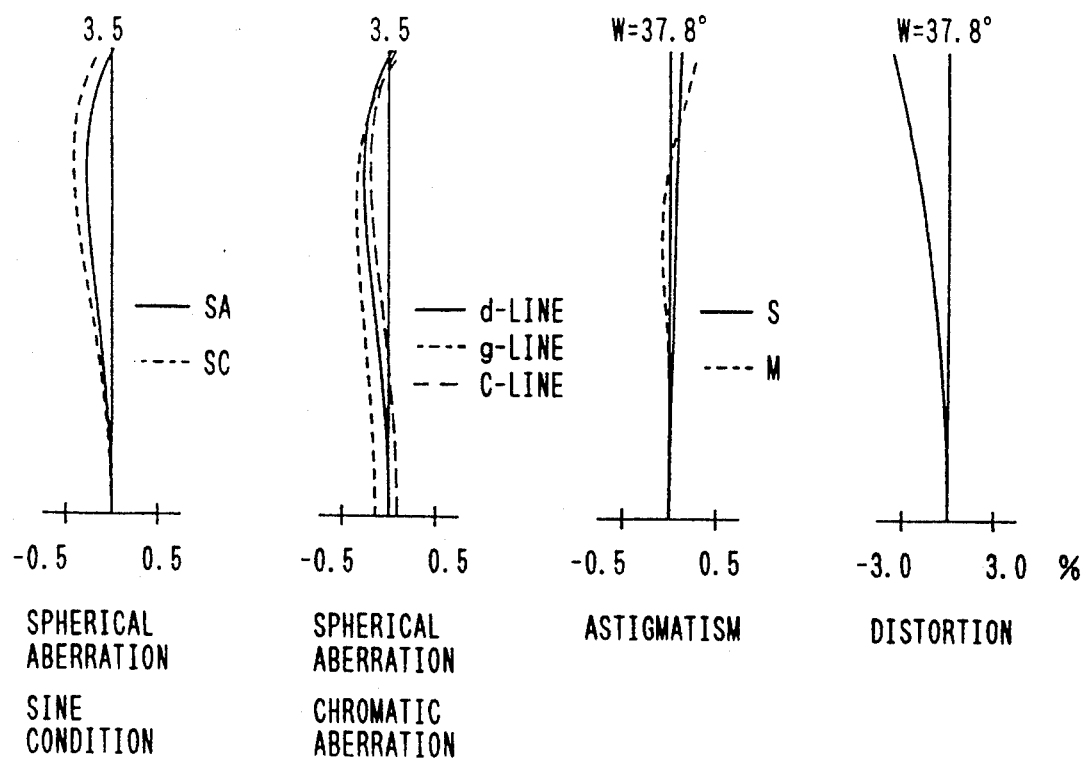
Figure 8B:
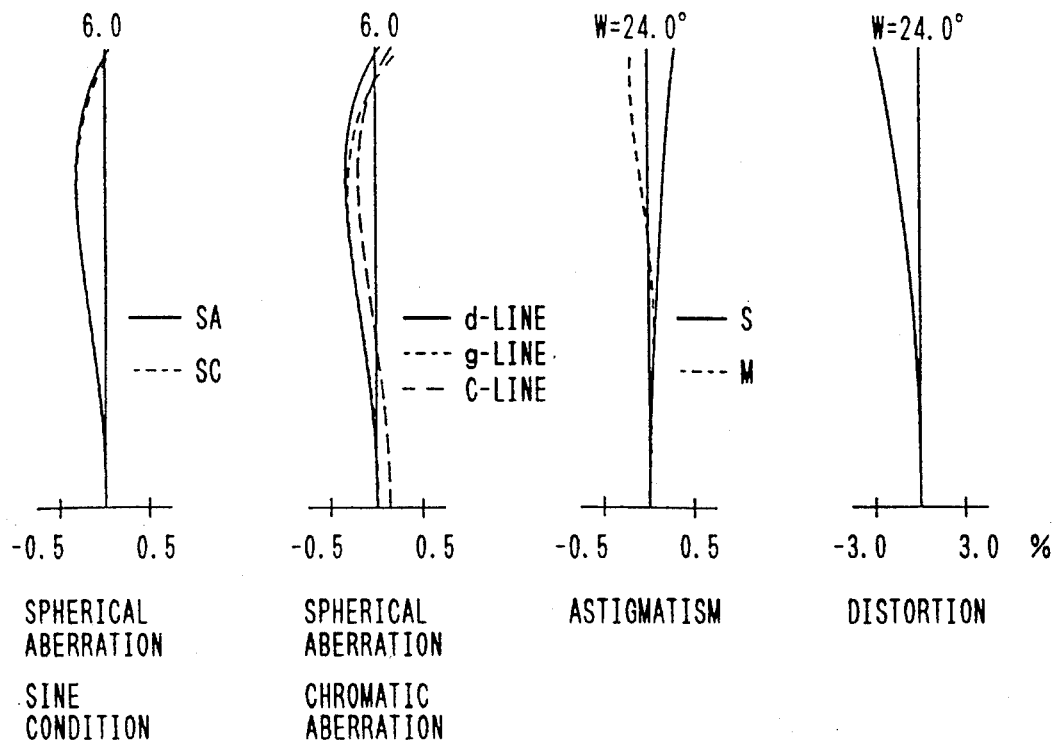
Figure 8C:
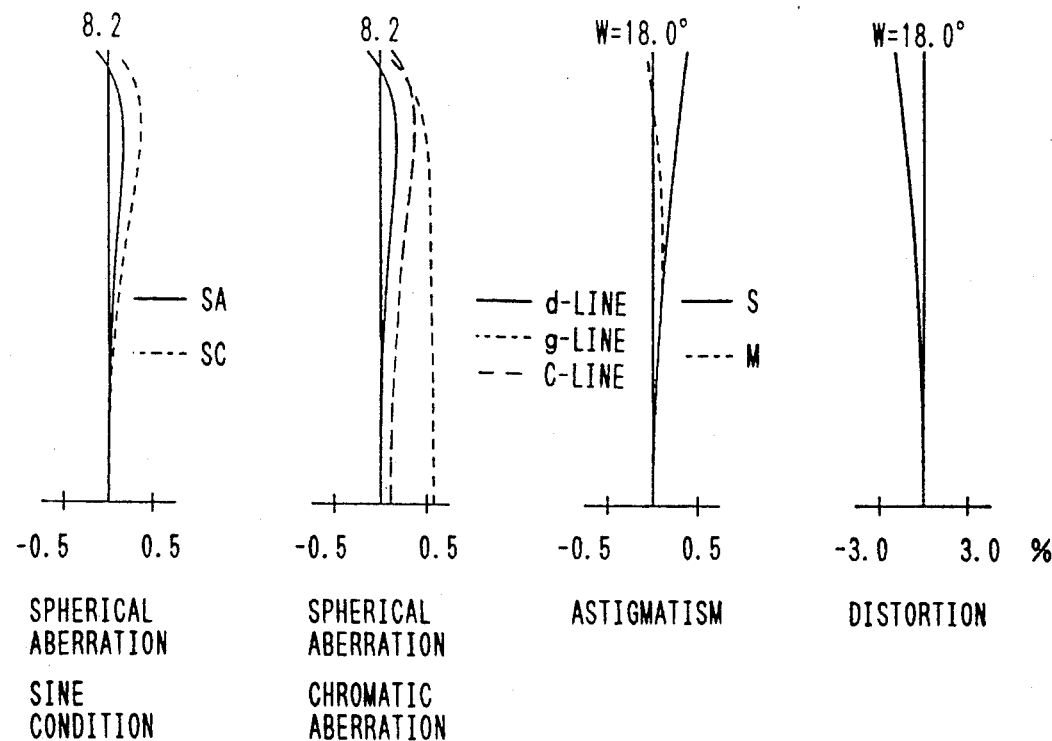
Figure 9:
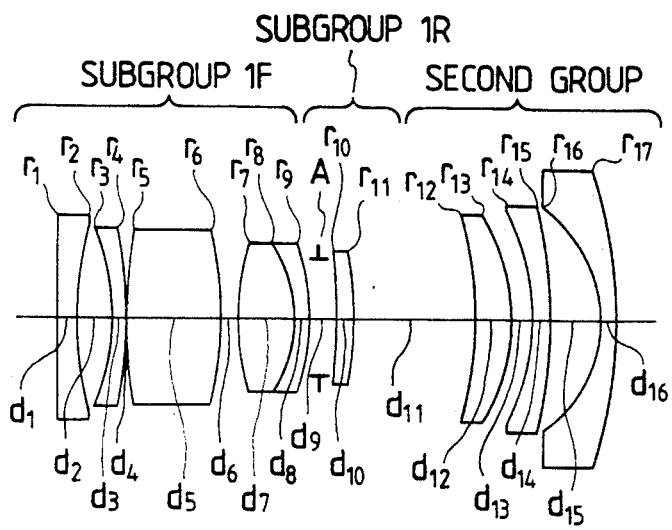
FIG. 9 is a simplified cross-sectional view of the lens system of Example 5, including a diaphragm stop A, at the wide-angle end for an infinitely distant object.
Figure 10A:
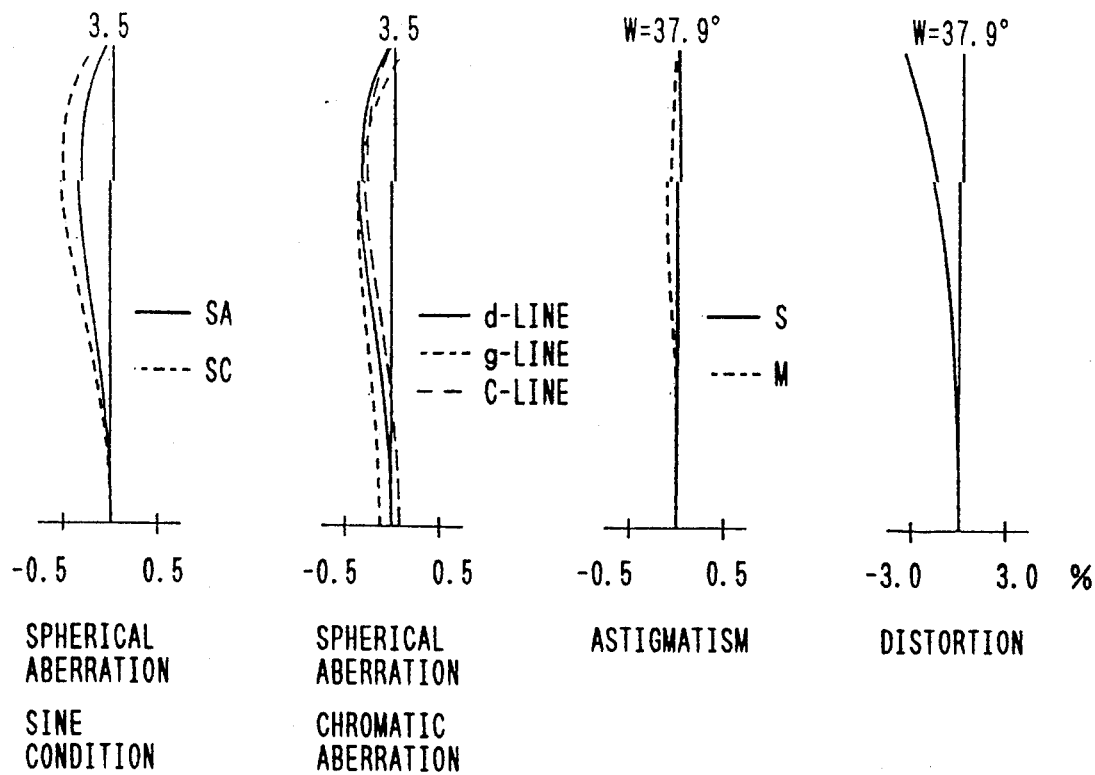
FIGS. 10a, 10b and 10c are graphs plotting the aberration curves obtained with the lens system of Example 1, with (a) showing the state at the wide-angle end, (b), the middle-angle end, and (c), the narrow-angle end.
Figure 10B:
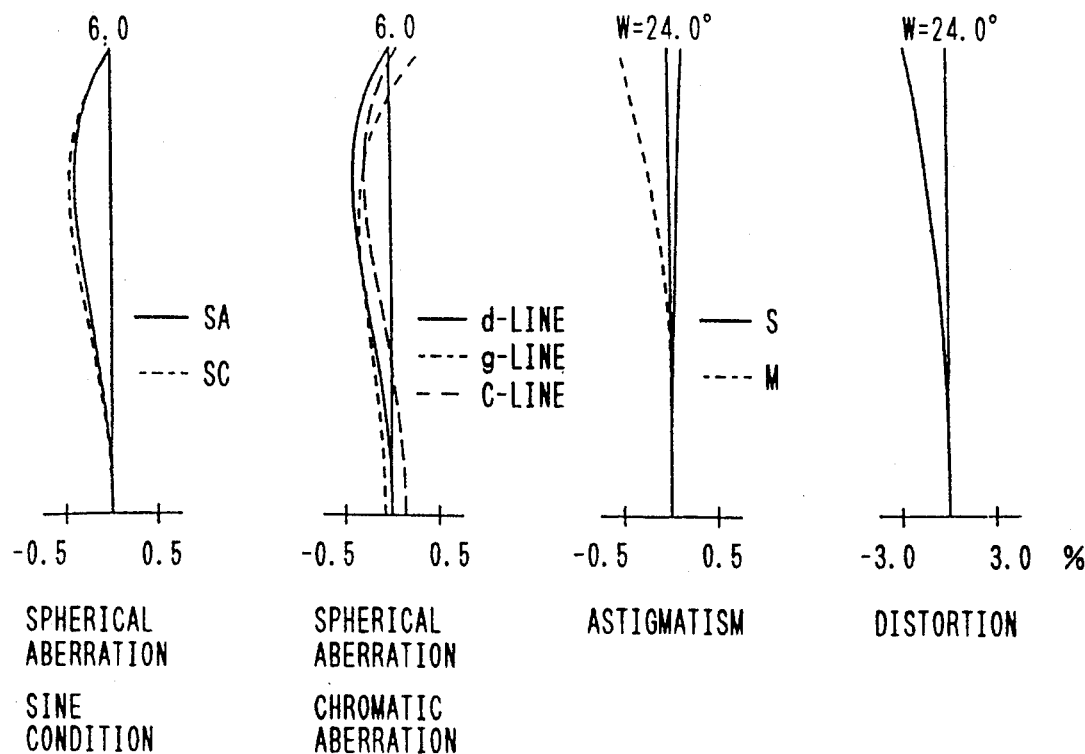
Figure 10C:
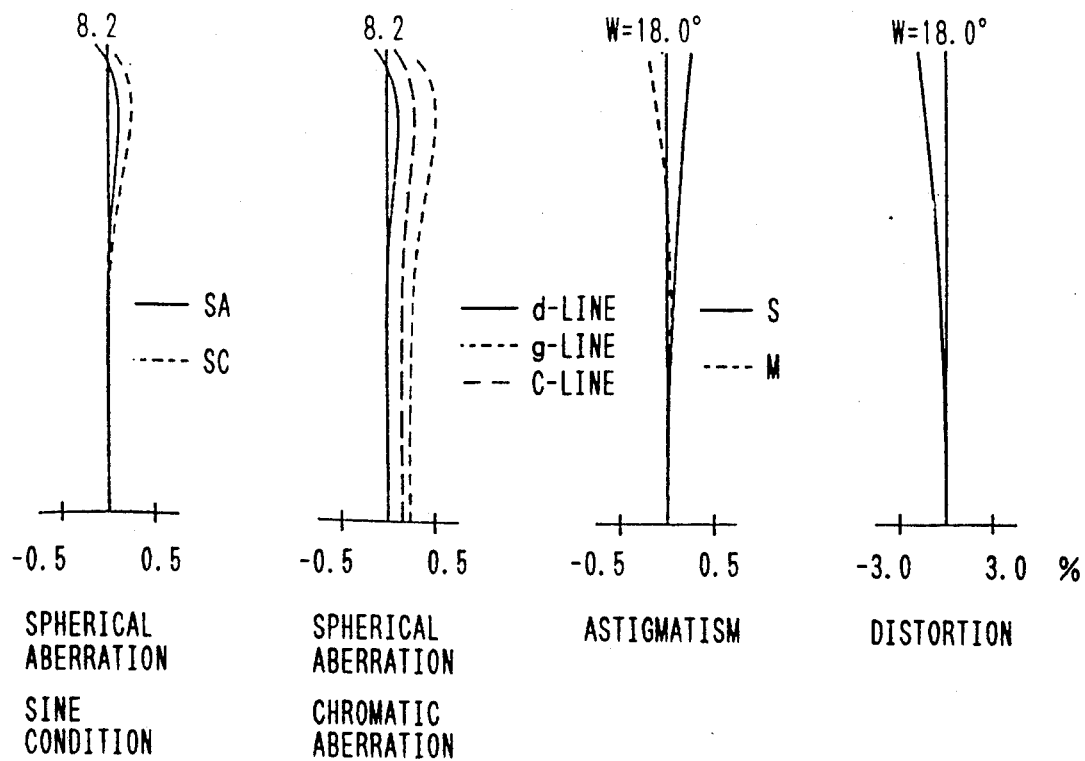

The first lens in the conventional two-group type zoom lens systems for use with a compact camera has been a positive lens in almost all cases. Basically, the zoom lens system of the present invention is also of a telephoto type (in terms of the relationship between the first and second lens groups) but in order to cover a wide half view angle of ca. 37 degrees at the short focus end while insuring a comparatively long back focus, the positive first lens group is composed of a positive subgroup 1F and a positive, small-power subgroup 1R to provide an unconventional unique lens arrangement of a retrofocus type starting with a negative lens on the object side.

Conditions (1) and (2) relate to a refractive power distribution of first two negative lenses of a lens subgroup 1a. If the upper limit of condition (1) is exceeded, a negative refractive power of the first lens is too small so that the refractive load imposed on the second lens is excessive. As a result, it would be difficult to compensate for coma aberration and astigmatism on the short focal length side. Conversely, if the lower limit is exceeded, the refractive load imposed on the first lens is increased. This is also not desirable.

Condition (2) relates to a composite refractive power of the first and second lenses. If the upper limit is exceeded, a negative refractive power thereof becomes small so that it would be difficult to keep a back focus at a sufficient level. If the lower limit is exceeded, the negative refractive power is excessive, which is undesirable in compensation for aberrations.

It should be noted that Japanese Patent Application No. hei-1-272392 relates to a zoom lens having a zoom ratio of about 2 so that it suffices to provide only one negative lens. If the zoom ratio would be increased with the same lens arrangement up to 2.5, the coma aberration and astigmatism would be abruptly increased.

Condition (3) relates to a refractive power of the first lens group as a whole. If the upper limit is exceeded, it is easy to make the lens system compact but the positive refractive power is excessive. Since the system of the retrofocus type, it is likely to generate a high order aberration. It would be difficult to compensate for the aberrations within the first lens group. Since the second lens group is of the enlargement lens type, the aberrations are increased. If the lower limit is exceeded, it is easy to compensate for the aberrations, the amount of movement of each lens group is abruptly increased (in particular in the second lens group), which is inconsistent with the miniaturization.

Condition (4) relates to an aspherical surface in the subgroup 1a. If this condition is met, it is possible to well compensate for the spherical aberration and coma aberration by using an aspherical surface having an aspherical surface amount of divergency relative to a radius of curvature of paraxial ray. The "divergency" means that, in the case of a concave surface, the radius of curvature is smaller as the radius is increased, whereas in the case of convex surface, the radius of curvature is larger as the radius is increased. If the upper limit is exceeded, the effect of the spherical surface would be eliminated, so that is would be difficult to well compensate for the aberrations. If the lower limit is exceeded, it is likely to generate a high order aberration.

It is necessary here to add supplemental comments on the amount of change in the coefficient of a third-order aberration caused by an aspheric surface. An aspheric surface is generally expressed by the following equation:

$$x = \frac{cy^2}{1 + \sqrt{1 - c^2 y^2}} + a_4 y^4 + a_6 y^6 + a_8 y^8 + a_{10} y^{10} + \ldots$$

In the case where the focal length, f, is 1.0, or if $X = x/f$, $Y = y/f$, $C = fc$, $A_4 = f^3 a_4$, $A_6 = f^5 a_6$, $A_8 = f^7 a_8$, and $A_{10} = f^9 a_{10}$ are substituted into said equation, the result is:

$$X = \frac{CY^2}{1 + \sqrt{1 - C^2 Y^2}} + A_4 Y^4 + A_6 Y^6 + A_8 Y^8 + A_{10} Y^{10} + \ldots$$

The second and subsequent terms of this equation give the amount of aspheric surface and the coefficient $A_4$ in the second term has the following relationship with the coefficient of a third-order asphericity $\phi$:

$$\phi = 8(N' - N) A_4$$

where N is the refractive index of a lens surface before it is made aspheric and N' is the refractive index of the same surface after it is rendered aspheric.

The coefficient of a third-order asphericity introduces the following amounts of change in the coefficients of various third-order aberrations considered in the theory of aberrations:

| | | |
|---|---|---|
| $\Delta I$ | = | $h^4 \phi$ |
| $\Delta II$ | = | $h^3 \bar{h} \phi$ |
| $\Delta III$ | = | $h^2 \bar{h}^2 \phi$ |
| $\Delta IV$ | = | $h^2 \bar{h}^2 \phi$ |
| $\Delta V$ | = | $h \bar{h}^3 \phi$ | where
I: the coefficient of spherical aberration;
II: the coefficient of coma;
III: the coefficient of astigmatism;
IV: the coefficient of truncated spherical field curvature;

V: the coefficient of distortion;

h: the height of intercept of each lens surface by paraxial, on-axis rays; and $\bar{h}$: the height of intercept of each lens surface by paraxial, off-axis rays passing through the center of the pupil.

The shape of an aspheric surface may be expressed in various other ways using clonicity coefficients or odd-numbered order terms and satisfactory approximation can be made using only even-numbered order terms if y is smaller than a paraxial radius of curvature. Hence, it should be noted that one cannot depart from the scope of the present invention merely by using equations for the shape of an aspheric surface that are different from the one described above.

It is further preferable to meet the following conditions (5) to (10) with respect to the subgroup 1a.

Condition (5) relates to a refractive power of the subgroup 1a as a whole. If the subgroup 1a does not have a large refractive power, it is possible to suppress the degration in performance relative to a relative manufacture error (i.e., eccentricity) between the subgroups 1a and 1b. Accordingly, it is preferable that Condition (5) is larger than the lower limit. If the upper limit is exceeded, it is difficult to keep a necessary back focus.

Conditions (6) and (7) relate to radii of curvature of a surface (concave surface), on the image side, of the negative first lens and a surface (concave surface), on the object side, of the negative second lens. In either case, if the upper limit is exceeded, the radius of curvature of the surface in question is excessive, so that it would be difficult to compensate for the astigmatism and curvature of field. If the lower limit is exceeded, the radius of curvature is too small, so that the aberrations would be excessively compensated for, resulting in generation of high order aberrations.

Condition (8) relates to a radius of curvature of a surface (convex surface), on the object side, of the positive third lens. This condition is needed for compensate for the excessive aberrations generated through the first and second lenses, with the subgroup 1a. If the upper limit is exceeded, the radius of curvature of this surface is too large, resulting in an insufficient compensation. As a result, a refractive load imposed on the positive subgroup 1b is increased. If the lower limit is exceeded, the radius of curvature is too small, resulting in excessive compensation. As a result, the balance in aberration compensation within the subgroup 1a is broken.

Conditions (9) and (10) relate to optical material of the negative second lens and the positive third lens. If the upper limit of condition (9) is exceeded, the Petzval's sum is likely to be a negative value, and it would be difficult, particularly, the astigmatism and curvature of field on the short focal length side. Also, if the upper limit of condition (10) is exceeded, it would be difficult to compensate for transverse chromatic aberration (lateral aberration).

Conditions (11) and (12) relate to the subgroup 1b. Since the first lens group is of the retrofocus type, it is necessary to increase a refractive power of the positive subgroup 1b. It is difficult to compensate, with only the cemented lens (1b-1 and 1b-2), the excessive aberration diverged in the negative subgroup 1a. Accordingly, it is preferable to arrange another positive lens (1b-3) in the system.

Condition (11) relates to a refractive power of the lens 1b-3. If the upper limit is exceeded, in the case where it is made of plastic, the refractive power thereof is excessive. A focus displacement due to a change in temperature and humidity is increased, which is unsuitable for a compact camera. If a lower limit is exceeded, the lens has no positive power. As a result, as described above, the refractive load imposed on the lenses 1b-1 and 1b-2 is increased. In this case, the arrangement of the lens b-3 is meaningless.

Condition (12) relates to an aspheric surface of the lens 1b-3. Since the subgroup 1b has a large positive refractive power, it is preferable to provide an aspherical surface amount of divergence in order to compensate for the aberration within the subgroup 1b. If the lower limit is exceeded, the lens has no divergent aspherical surface. If the lower limit is exceeded, a high order aberration is likely to be generated, and the performance degration due to the manufacture error of the aspherical surface and the change in temperature and humidity.

Condition (13) relates to the two negative lenses in the second lens group. If the lower limit is exceeded, in particular, it is difficult to compensate for the field curvature on the short focal length side.

Also, as a problem concomitant with the wide angle tendency, there is a marginal light problem. It is important to keep a sufficient amount of marginal light even in the wide angle mode. if the position of the stop diaphragm is between the first and second lens groups. It is easy to manufacture the system and to facilitate the structure. However, in this case, a height of the marginal light having a maximum view angle and passing through the stop diaphragm, so that the increase of the marginal light when the stop diaphragm is at a small aperture is not expected. Accordingly, if the fixed stop diaphragm is provided behind the aforesaid diaphragm and the inlet pupil is set as rearward as possible, it is possible to increase the amount of marginal light when the diaphragm is set at a small aperture.

Condition (14) relates to a position of the fixed diaphragm. If the upper limit is exceeded, it is easy to increase the amount of marginal light but the diameter of the front lens would be increase. Also, in order to separate the second lens group away from the fixed stop diaphragm, it is necessary to increase a distance between the first and second groups at the telephoto side. Accordingly, it is difficult to attain the high zoom ratio and miniaturization. If the lower limit is exceeded, it is meaningless to provide the fixed stop diaphragm. In this case, it is not expected to increase the amount of the marginal light when the stop is set at a small aperture.

EXAMPLES

Two examples of a first aspect of the invention are described below with reference to data sheets, in which: f denotes the focal length; $\omega$, half view angle; $f_B$, back focus; r, the radius of curvature of an individual lens surface; d, the thickness of an individual lens or the aerial distance between adjacent lenses, N, the refractive index of an individual lens at the d-line; $\nu$, the Abbe number of an individual lens; and $\alpha_4$, $\alpha_6$ and $\alpha_8$ signify the asphericity coefficients of fourth-, sixth-and eighth-order aberrations, respectively.

EXAMPLE 1

| $F_{NO} = 1:3.5 \sim 8.2$ | $f = 28.90 \sim 68.0$ |
|---|---|
| $\omega = 37.8 \sim 17.9°$ | $f_B = 8.55 \sim 50.30$ |

Surface

-continued

| $F_{NO} = 1:3.5\sim8.2$ | | $f = 28.90\sim68.0$ | |
|---|---|---|---|
| $\omega = 37.8\sim17.9°$ | | $f_B = 8.55\sim50.30$ | |

| No. | r | d | N | $\nu$ |
|---|---|---|---|---|
| 1 | 1000.000 | 1.20 | 1.73077 | 40.5 |
| 2* | 27.138 | 2.12 | | |
| 3 | −22.520 | 1.20 | 1.83481 | 42.7 |
| 4 | −158.449 | 0.50 | | |
| 5 | 76.800 | 6.06 | 1.69895 | 30.1 |
| 6 | −45.058 | 0.94 | | |
| 7 | 14.953 | 6.49 | 1.48749 | 70.2 |
| 8 | −10.946 | 1.20 | 1.80518 | 25.4 |
| 9 | −15.898 | 0.10 | | |
| 10 | −141.243 | 1.50 | 1.49186 | 57.4 (plastic) |
| 11* | −47.824 | 11.48~3.25 | | |
| 12 | −34.205 | 3.03 | 1.80518 | 25.4 |
| 13 | −15.252 | 2.04 | | |
| 14 | −13.151 | 1.35 | 1.83400 | 37.2 |
| 15 | −34.003 | 2.37 | | |
| 16 | −14.451 | 1.40 | 1.83400 | 37.2 |
| 17 | −52.442 | | | |

| 2nd Surface: Aspherical | 11th Surface: Aspherical |
|---|---|
| $a_4 = 0.62440672 \times 10^{-4}$ | $a_4 = 0.78101779 \times 10^{-4}$ |
| $a_6 = 0.12003571 \times 10^{-6}$ | $a_6 = 0.22049808 \times 10^{-6}$ |
| $a_8 = 0.16918644 \times 10^{-7}$ | $a_8 = 0.53000777 \times 10^{-8}$ |

EXAMPLE 2

| $F_{NO} = 1:3.5\sim8.2$ | | $f = 28.90\sim68.0$ | |
|---|---|---|---|
| $\omega = 37.9\sim17.9°$ | | $f_B = 8.55\sim50.57$ | |

| Surface No. | r | d | N | $\nu$ |
|---|---|---|---|---|
| 1 | −319.190 | 1.20 | 1.73077 | 40.5 |
| 2* | 26.067 | 2.10 | | |
| 3 | −26.975 | 1.20 | 1.83481 | 42.7 |
| 4 | −185.357 | 0.50 | | |
| 5 | 60.532 | 6.70 | 1.69895 | 30.1 |
| 6 | −58.445 | 1.19 | | |
| 7 | 14.343 | 6.69 | 1.48749 | 70.2 |
| 8 | −11.421 | 1.20 | 1.80518 | 25.4 |
| 9 | −16.327 | 0.10 | | |
| 10 | −102.627 | 1.50 | 1.49186 | 57.4 (plastic) |
| 11* | −48.561 | 11.52~3.26 | | |
| 12 | −31.576 | 2.95 | 1.80518 | 25.4 |
| 13 | −15.331 | 2.16 | | |
| 14 | −13.511 | 1.35 | 1.83400 | 37.2 |
| 15 | −32.718 | 2.41 | | |
| 16 | −14.205 | 1.40 | 1.83400 | 37.2 |
| 17 | −49.509 | | | |

| 2nd Surface: Aspherical | 11th Surface: Aspherical |
|---|---|
| $a_4 = 0.59290020 \times 10^{-4}$ | $a_4 = 0.88719410 \times 10^{-4}$ |
| $a_6 = 0.22079505 \times 10^{-6}$ | $a_6 = 0.37454732 \times 10^{-6}$ |
| $a_8 = 0.11889496 \times 10^{-7}$ | $a_8 = 0.51216085 \times 10^{-8}$ |

EXAMPLE 3

| $F_{NO} = 1:3.5\sim8.2$ | | $f = 28.90\sim68.0$ | |
|---|---|---|---|
| $\omega = 37.9\sim18.0°$ | | $f_B = 8.55\sim52.30$ | |

| Surface No. | r | d | N | $\nu$ |
|---|---|---|---|---|
| 1 | 175.046 | 1.20 | 1.73077 | 40.5 |
| 2* | 25.922 | 4.04 | | |
| 3 | −17.007 | 1.10 | 1.83481 | 42.7 |
| 4 | −92.259 | 0.50 | | |
| 5 | 27.140 | 5.68 | 1.68893 | 31.1 |
| 6 | −67.744 | 0.77 | | |
| 7 | 17.744 | 4.42 | 1.49782 | 66.8 |
| 8 | −11.279 | 1.20 | 1.84666 | 23.8 |
| 9 | −17.769 | 0.10 | | |
| 10 | −125.499 | 1.50 | 1.73077 | 40.5 |
| 11* | −43.767 | 12.84~3.44 | | |
| 12 | −31.042 | 2.82 | 1.80518 | 25.4 |
| 13 | −16.145 | 2.89 | | |
| 14 | −13.421 | 1.35 | 1.83400 | 37.2 |
| 15 | −24.923 | 1.50 | | |
| 16 | −14.966 | 1.40 | 1.83400 | 37.2 |
| 17 | −68.017 | | | |

| 2nd Surface: Aspherical | 11th Surface: Aspherical |
|---|---|
| $a_4 = 0.42225508 \times 10^{-4}$ | $a_4 = 0.55112514 \times 10^{-4}$ |
| $a_6 = 0.17295002 \times 10^{-7}$ | $a_6 = 0.17368110 \times 10^{-6}$ |
| $a_8 = 0.85028257 \times 10^{-8}$ | $a_8 = -0.20407004 \times 10^{-8}$ |

EXAMPLE 4

| $F_{NO} = 1:3.5\sim8.2$ | | $f = 28.90\sim68.0$ | |
|---|---|---|---|
| $\omega = 37.8\sim18.0°$ | | $f_B = 8.55\sim52.40$ | |

| Surface No. | r | d | N | $\nu$ |
|---|---|---|---|---|
| 1 | 142.505 | 1.20 | 1.73077 | 40.5 |
| 2* | 23.815 | 3.71 | | |
| 3 | −17.502 | 1.10 | 1.83481 | 42.7 |
| 4 | −88.112 | 0.50 | | |
| 5 | 36.799 | 5.71 | 1.68893 | 31.1 |
| 6 | −53.580 | 0.70 | | |
| 7 | 16.957 | 4.58 | 1.48749 | 70.2 |
| 8 | −11.382 | 1.30 | 1.80518 | 25.4 |
| 9 | −17.174 | 0.10 | | |
| 10 | −126.722 | 1.50 | 1.49186 | 57.4 (plastic) |
| 11* | −36.280 | 13.03~3.68 | | |
| 12 | −27.954 | 2.71 | 1.80518 | 25.4 |
| 13 | −16.018 | 3.16 | | |
| 14 | −13.373 | 1.35 | 1.83400 | 37.2 |
| 15 | −22.778 | 1.50 | | |
| 16 | −14.705 | 1.40 | 1.83400 | 37.2 |
| 17 | −65.466 | | | |

| 2nd Surface: Aspherical | 11th Surface: Aspherical |
|---|---|
| $a_4 = 0.51790684 \times 10^{-4}$ | $a_4 = 0.78338341 \times 10^{-4}$ |
| $a_6 = 0.47086556 \times 10^{-8}$ | $a_6 = 0.26399271 \times 10^{-6}$ |
| $a_8 = 0.12883048 \times 10^{-7}$ | $a_8 = -0.17053536 \times 10^{-8}$ |

| | Calculation Value Based on Conditions | | | |
|---|---|---|---|---|
| Conditions | EX. 1 | EX. 2 | EX. 3 | EX. 4 |
| (1) | −0.52 | −0.60 | −0.49 | −0.52 |
| (2) | −1.17 | −1.15 | −1.38 | −1.37 |
| (3) | 1.47 | 1.47 | 1.41 | 1.41 |
| (4) | −8.8 | −8.4 | −5.9 | −7.2 |
| (5) | −0.57 | −0.58 | −0.50 | −0.57 |
| (6) | 0.94 | 0.90 | 0.90 | 0.82 |
| (7) | 0.78 | 0.93 | 0.59 | 0.61 |
| (8) | 2.66 | 2.09 | 0.94 | 1.27 |
| (9) | 0.136 | 0.136 | 0.146 | 0.146 |
| (10) | 12.6 | 12.6 | 11.6 | 11.6 |
| (11) | 0.198 | 0.156 | — | 0.281 |
| (12) | −17.5 | −20.3 | — | −20.7 |
| (13) | 1.834 | 1.834 | 1.834 | 1.834 |
| (14) | — | — | 0.079 | 0.086 |

One major problem to be solved for insuring wide angles at the short focus end is associated with the brightness at the edge of an image field. When focusing with prior art zoom lens systems of a two-group type in which a diaphragm stop is provided between the first and second lens groups, the mechanistically simplest way is to move only the first lens group with the diaphragm stop and the second lens group being fixed. However, this method has suffered the disadvantage that the height of intercept of the diaphragm stop by marginal rays at a maximum view angle is too small to provide a desired increase in the brightness at the edge of an image field when the lens is stopped down.

Figure 12A:
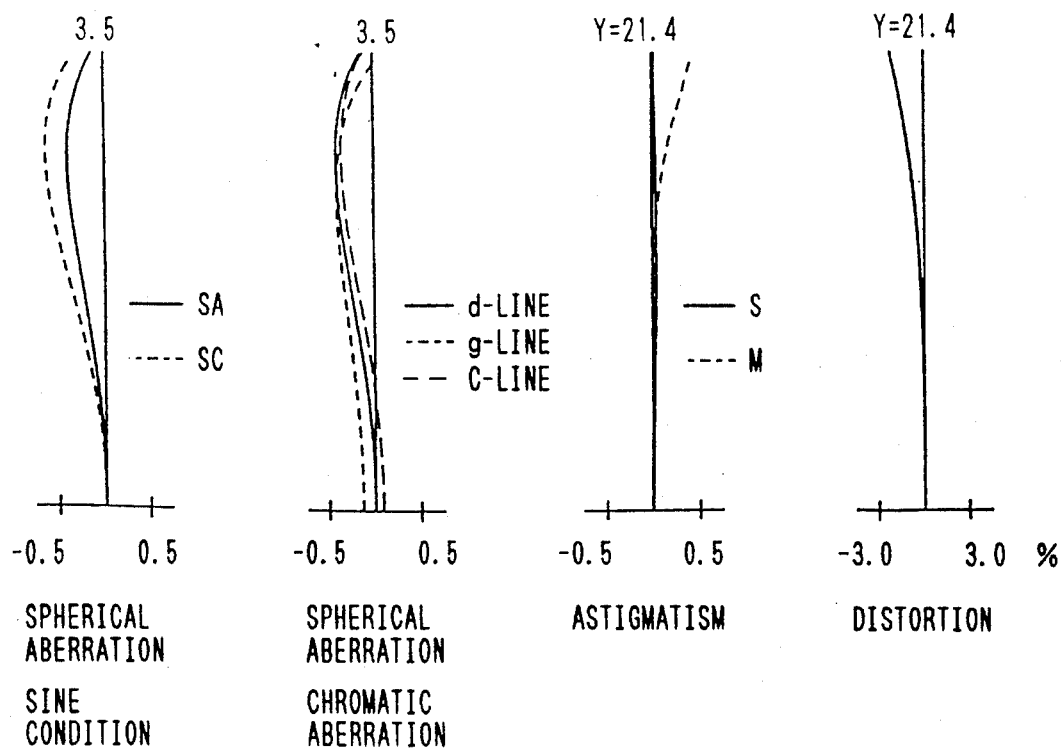
FIGS. 12a, 12b and 12c are graphs plotting the aberration curves obtained with the lens system shown in FIG. 11, with (a) showing the state at the wide-angle end, (b), the middle-angle end, and (c), the narrow-angle end.
Figure 12B:
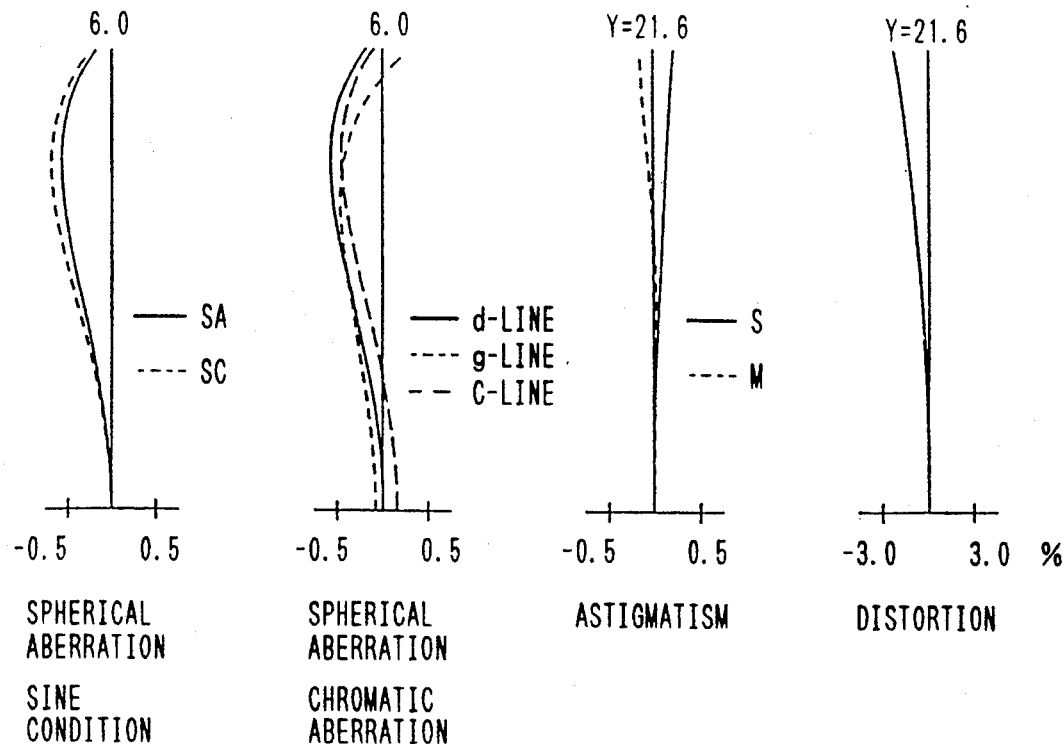
Figure 12C:
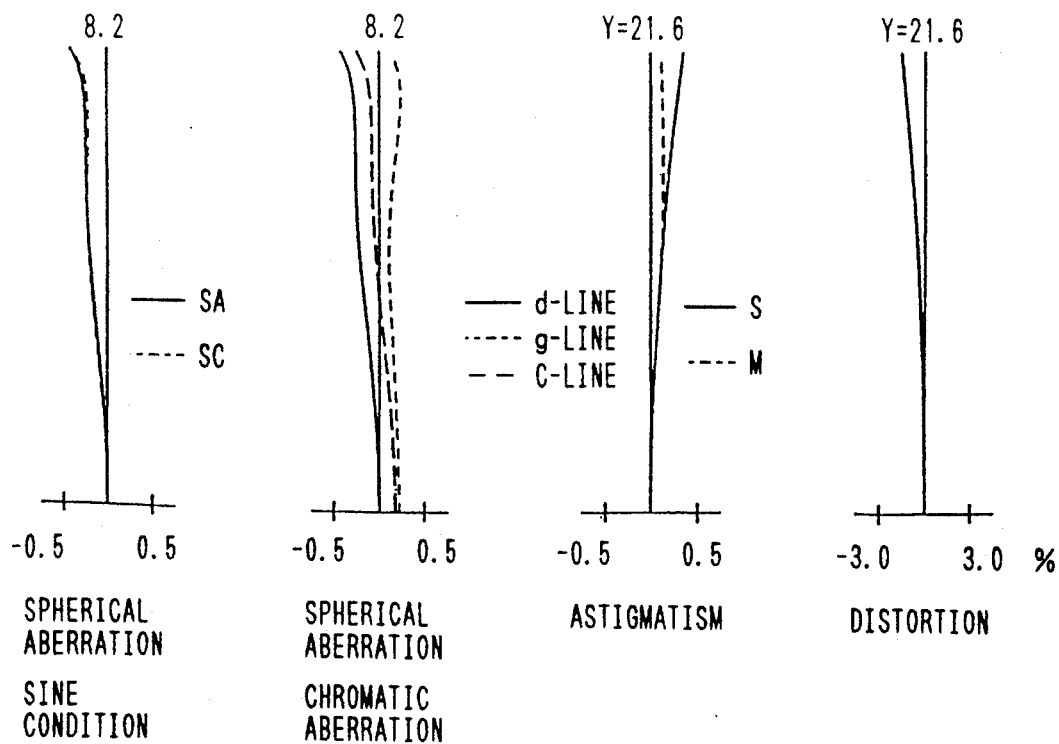
Figure 14A:
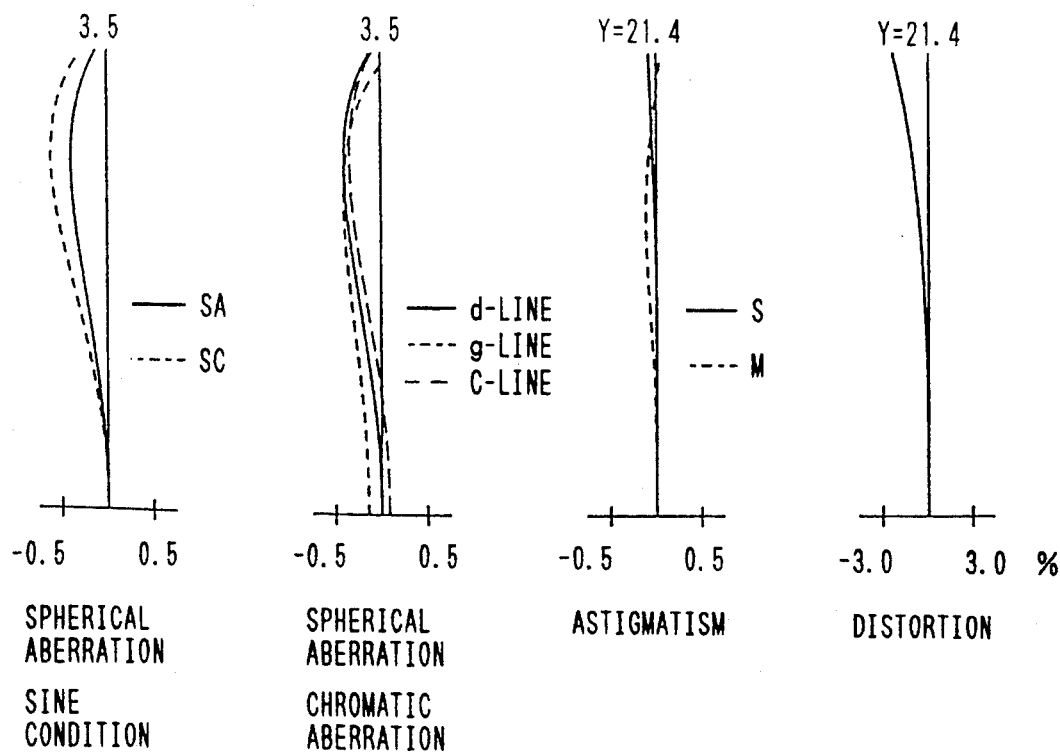
FIGS. 14a, 14b and 14c are graphs plotting the aberration curves obtained with the lens system shown in FIG. 13, with (a-) showing the state at the wide-angle end, (b), the middle-angle end, and (c), the narrow-angle end.
Figure 14B:
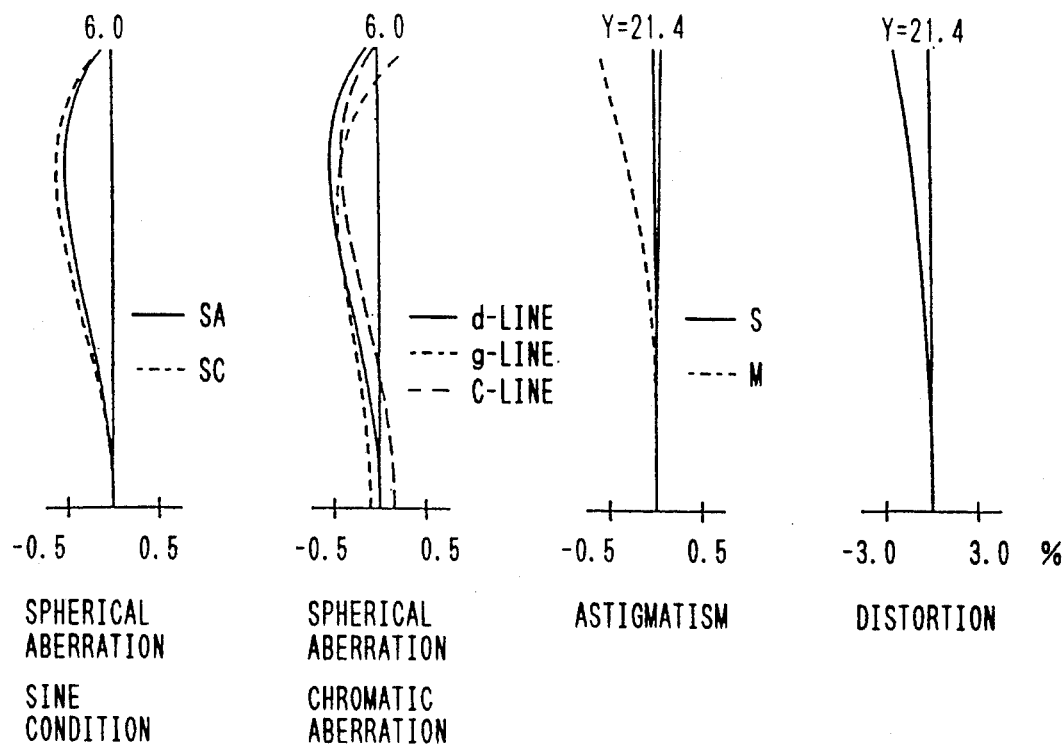
Figure 14C:
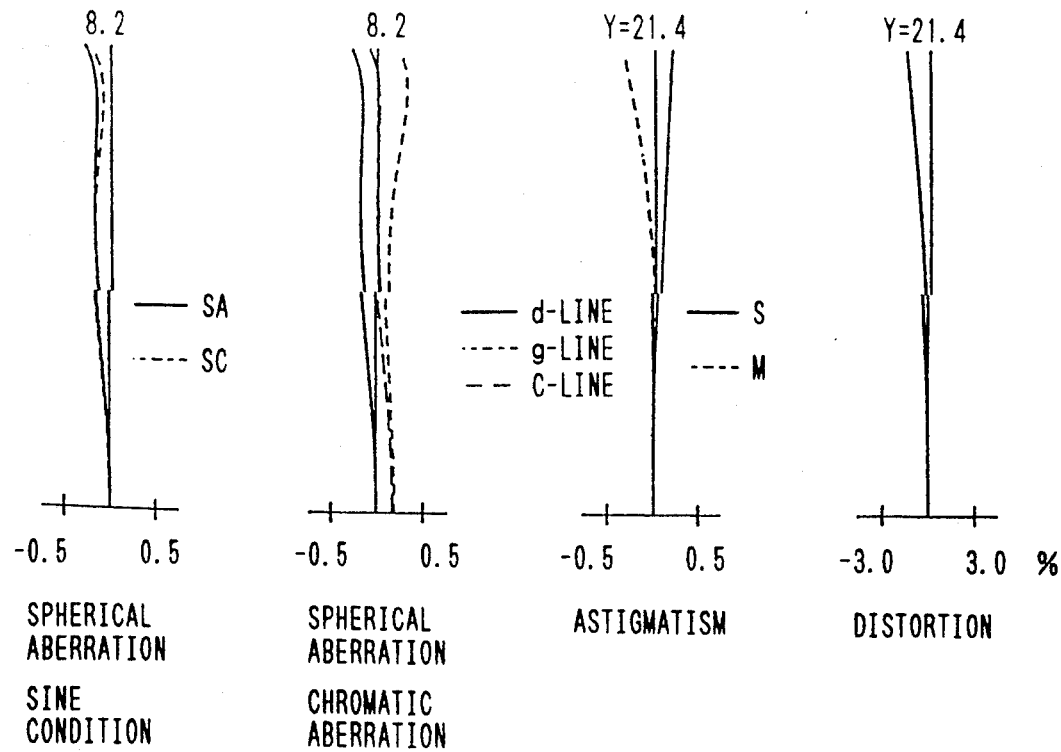
Figure 15:
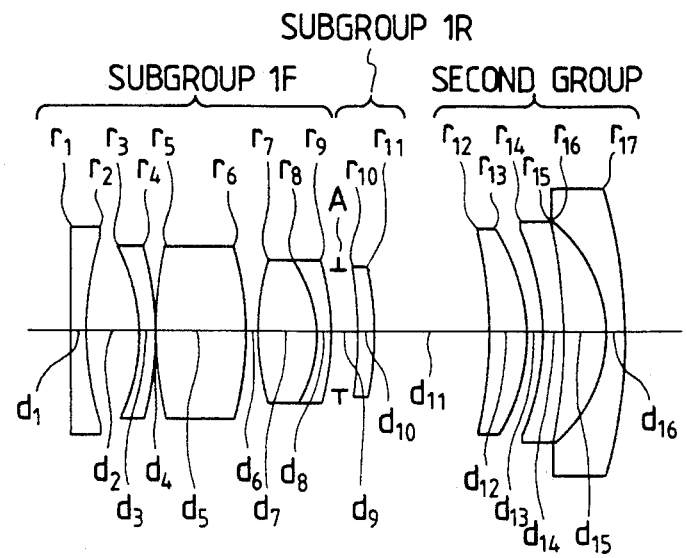
FIG. 15 is a simplified cross-sectional view of the lens system of Example 6, including a diaphragm stop A, at the wide-angle end for an infinitely distant object.
Figure 16A:
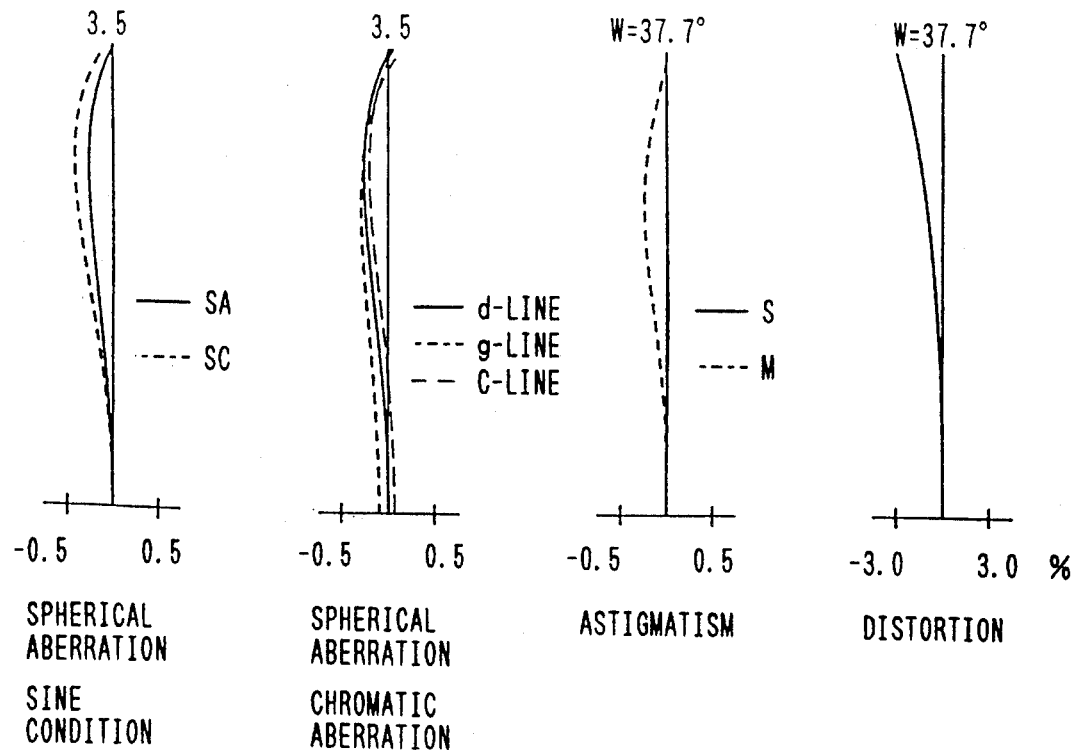
FIGS. 16a, 16b and 16c are graphs plotting the aberration curves obtained with the lens system of Example 6, with (a) showing the state at the wide-angle end, (b), the middle-angle end, and (c), the narrow-angle end.
Figure 16B:
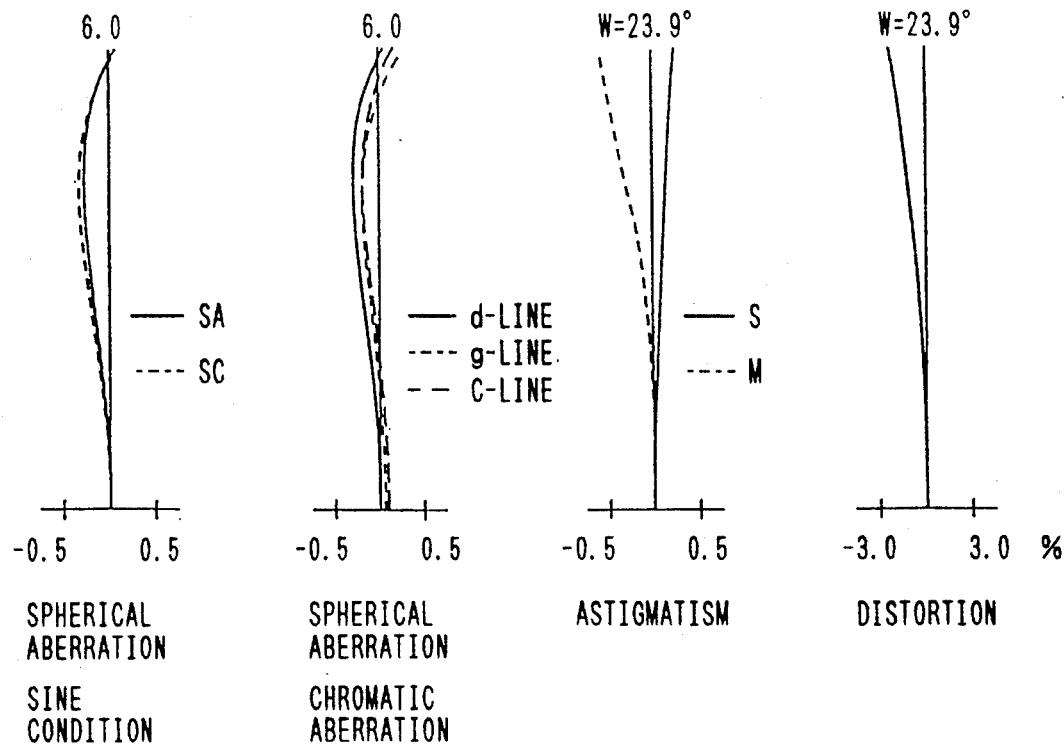
Figure 16C:
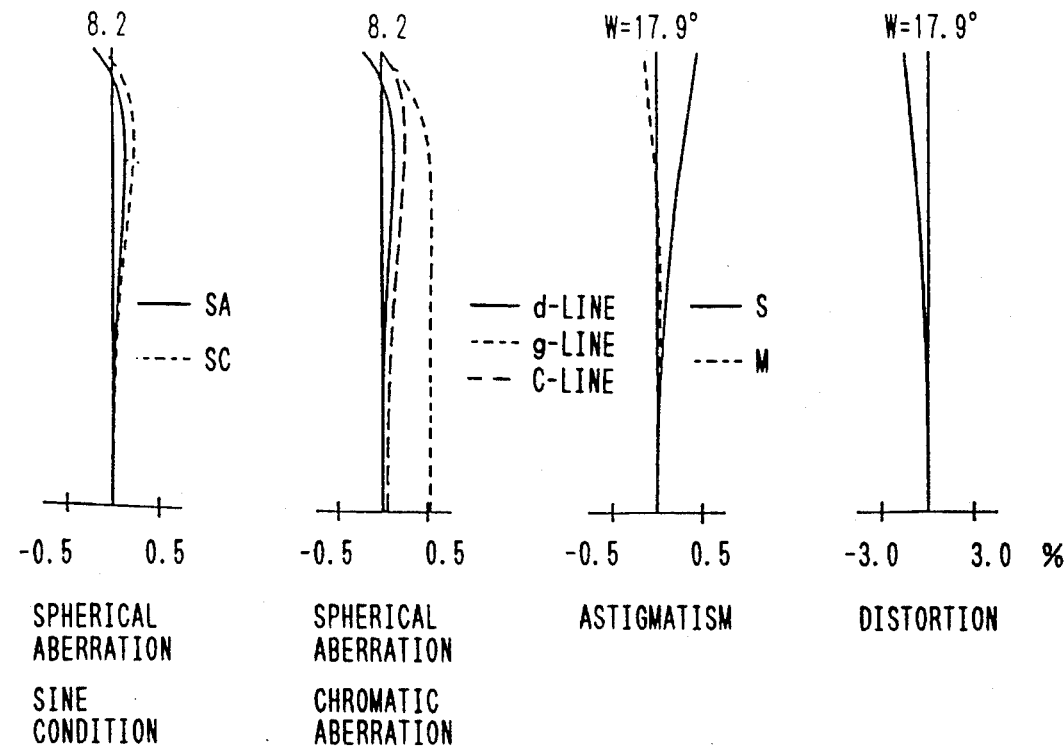

Another problem that occurs when focusing is done by moving the first lens group enmasse is that astigmatism and curvature of the field are under compensated by undesirable large amounts if the lens if focused for a near-distance object (see FIGS. 12 and 14).

A prior art proposal for improving the method of focusing with zoom lens systems of a two-group type is described in Unexamined Published Japanese Patent Application No. Hei-1-189620 but the half view angle that can be achieved at the short focus end is no wider than about 30 degrees and the first lens used is a positive lens as in the other prior art proposals. In other words, one of the objects of the present invention, namely, providing a wide coverage of angles at the short focus end, cannot be attained by the method described in said patent. The zoom lens system for use with a compact camera that is provided by another aspect of the present invention adopts basically a simple two-group type lens arrangement and yet it achieves not only a broader coverage of angles but also an even higher zoom ratio by modifying the compositions of the first lens group and the diaphragm stop. The so constructed zoom lens system is capable of focusing from an infinitely distant object to a near-distance object with reduced aberrational variations. The present invention also provides a method of focusing with this improved zoom lens system.

According to this aspect of the invention, by modifying the position of a diaphragm stop and the method of focusing, not only can the lens system perform focusing from an infinitely distant object to a near-distance object with reduced variations but also the brightness at the edge of an image field can be increased even when the lens system is stopped down.

As mentioned before condition (1) relates to the power of the negative first lens. If the upper limit of this condition is exceeded, the negative power of the first lens will decrease so much that it becomes difficult to increase the back focus to a reasonable value. If the lower limit of condition (1) is not reached, the negative power of the first lens becomes excessive, which is undesirable from the viewpoint of aberrational compensation.

Condition (15) relates to the power of the rear subgroup 1R. The front subgroup 1F responsible for almost all part of the power of the first lens group and if one makes an attempt to design a compact and yet wide-angle lens system, the power of the first lens group becomes so strong as to cause increase coma. In order to solve this problem, the rear subgroup 1R having a small power is positioned a short distance [that satisfies condition (16)] behind the front subgroup 1F so as to reduce the burden on it, to thereby insure efficient compensation for coma. If the upper limit of condition (15) is exceeded, the power of the rear subgroup 1R increases so much as to cause extensive coma in that subgroup. In addition, the amount of lens movement will increase if the front subgroup 1F is used as a focusing lens. If the lower limit of condition (15) is not reached, the power of the front subgroup 1F will increase so much as to cancel the effect of positioning the rear subgroup 1R behind the front subgroup 1F.

As mentioned in the preceding examples, condition (3) relates to the overall power of the first lens group. If the upper limit of this condition is exceeded, the result is favorable for size reduction but, on the other hand, the back focus is likely to decrease and the amount of defocusing due to positional errors of the first and second lens groups will increase so markedly at the narrow-angle end that considerable difficulty will be involved in manufacturing the intended lens system. If the lower limit of condition (3) is not reached, the result is favorable for aberrational compensation but, on the other hand, the amount by which the respective lens groups (especially the second lens group) has to be moved during focusing will increase so markedly that the purpose of size reduction cannot be achieved.

Condition (16) relates to the distance between the front subgroup 1F and the rear subgroup 1R. If the upper limit of this condition is exceeded, no compact lens system can be realized although aberrations can be easily compensated for. If the lower limit of condition (16) is not reached, not only will coma increase but also it becomes difficult to insert a stop diaphragm.

In order to facilitate the design of a wide-angle lens system, the front subgroup 1F preferably comprises, in order from the object side, a first lens unit 1a composed of at least three lens elements including two negative lens elements and a positive lens, and a second lens unit 1b having a strong positive power, with conditions (17) and (18) being satisfied.

Condition (17) relates to the power of the two negative lenses in the first lens unit 1a. If the upper limit of this condition [which is correlated to condition (1)] is exceeded, it is difficult to increase the back focus. If the lower limit of condition (17) is not reached, the negative power will increase and (since the first lens group has a strong positive power) the positive power of the second lens unit 1b will unavoidably become so strong as to increase the chance of the occurrence of higher-order aberrations.

Condition (18) relates to the power of the second lens unit 1b which is responsible for the greater part of the power of the first lens group. If the upper limit of this condition (18) is exceeded, the power of the second lens unit 1b will become so strong as to increase the chance of the occurrence of higher-order aberrations. If the lower limit of condition (18) is not exceeded, the power of the second lens unit 1b will decrease and the purpose of size reduction cannot be achieved.

As mentioned before, condition (7) relates to the aspheric surface in the first lens unit 1a. If the upper limit of this condition is exceeded, the first lens unit 1a will not have a divergent aspheric surface and, in particular, difficulty will be involved in achieving effective compensation for coma and astigmatism at the wide-angle end. If the lower limit of condition (7) is not reached, overcompensation will result to cause higher-order aberrations. In addition, it becomes difficult to produce a desired aspheric surface.

Conditions (15), (19) and (20) relate to the rear subgroup 1R of the first lens group. Since the rear subgroup 1R has a comparatively small power, it can be made of plastic materials. If lenses of a comparatively small power are made of plastic materials, the amount of defocusing or deterioration in lens performance is small despite possible changes in temperature or humidity. In addition, the overall weight of the lens system can be reduced. Further, it is easy to make an aspheric surface of plastic lenses and this contributes to an improvement in lens performance.

Supplemental comments are also necessary on the amount of deforcusing with plastic lenses that can occur in response to changes in temperature or humidity. Plastics will experience temperature- or humidity-dependent changes in linear expansion coefficient or refractive index that are at least about 10 times as great as ordinary glass materials. If the amount of change in the focal length of a plastic lens is written as Δf, the amount of defocusing Δp can be expressed by $$\Delta p = \Delta f(m' - m)^2$$

where m' is the lateral magnification of the lens groups exclusive of and subsequent to the plastic lens, and m is the lateral magnification of the combination of the plastic lens and subsequent lens groups.

Therefore, if condition (19) is not satisfied, the amount of defocusing in response to changes in temperature or humidity will increase to such a value that the lens system is no longer suitable for use with a compact camera.

If the rear subgroup 1R of a small power is to be formed of a plastic material, it is preferably designed as a positive lens that satisfies condition (15) for the purpose of reducing the amount of defocusing in response to changes in temperature. At elevated temperatures, the lens barrel will extend to increase the distance between the first and second lens groups, thereby causing the focus position to shift toward the lens. However, with a positive plastic lens, the focus position will be shifted away from the lens at elevated temperatures. Thus, by designing an appropriate power distribution, the positive plastic lens is more effective than glass lenses in reducing the amount of defocusing due to changes in the focus position that are caused by temperature variations.

As aspheric surface can be formed of plastic lenses more easily than glass lenses. Condition (20) relates to the aspheric surface to be formed in the rear subgroup 1R. If the upper limit of this condition is exceeded, the rear subgroup 1R will not have a divergent aspheric surface and the under compensation that occurs in the second lens unit 1b cannot be effectively corrected. If the lower limit of condition (20) is not reached, overcompensation will result to cause higher-order aberrations. In addition, it becomes difficult to produce a desired aspheric surface.

As mentioned before, condition (13) relates to the two negative lenses in the second lens group. If this condition is not satisfied, it becomes difficult to effectively compensate for curvature of the field at the wide-angle end.

Having described the lens arrangement of the system of the present invention according to its first aspect, we now describe the method of focusing with this lens system according to the second aspect of the present invention.

In its broadest scope, the focusing method of the present invention is characterized by moving the front subgroup 1F and the rear subgroup 1R of the first lens group independently of each other, with a diaphragm stop being provided between the two subgroups. The diaphragm stop provided between the two subgroups 1F and 1R permits the brightness at the edge of an image field to increase when the lens is stopped down. Furthermore, if the first lens group is moved toward the object as the distance between the two subgroups 1F and 1R is increased, focusing can be accomplished from an infinitely distant object to a near-distance object with reduced variations in astigmatism and curvature of the field.

Condition (21) relates to the movement of the front subgroup 1F and the rear subgroup 1R during focusing. If the upper limit of this condition is exceeded, the amounts of movement of the two subgroups become so close to each other that the result is not substantially different from the case of focusing by moving the first lens group en masse, whereby difficulty is encountered with effective compensation for astigmatism and curvature of the field. If the lower limit of condition (21) is not reached, the rear subgroup 1R will move toward the image, causing undesired overcompensation for curvature of the field. If both the diaphragm stop and the rear subgroup 1r are adapted to remain fixed during focusing, the lens system will become mechanistically simple enough to facilitate its manufacture on a commercial scale.

Figure 11:
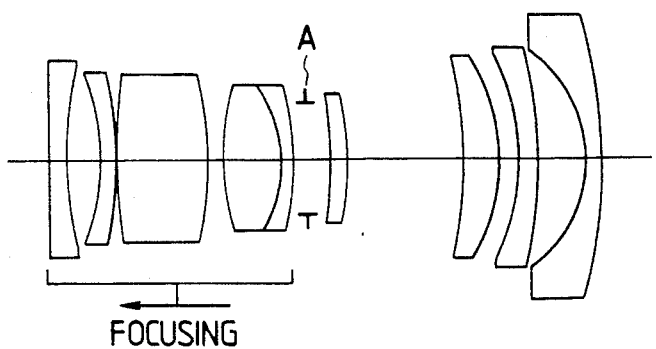
FIG. 11 is a simplified cross-sectional view of the lens system of Example 5, including a diaphragm stop A, for an object-to-image distance of 1 m after focusing by moving only the front subgroup 1F.
Figure 13:
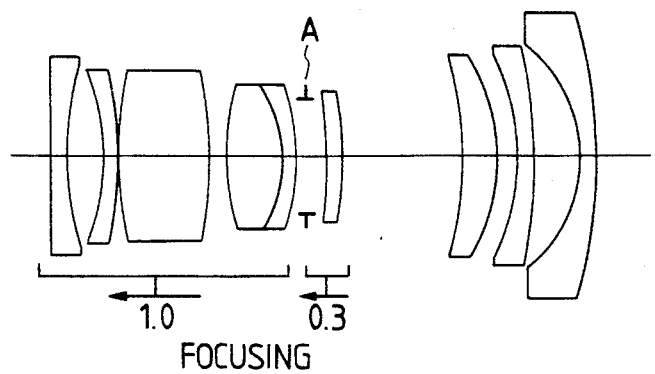
FIG. 13 is a simplified cross-sectional view of the lens system of Example 5, including a diaphragm stop A, for an object-to-image distance of 1 m after focusing by moving the front and rear subgroups 1F and 1R in a ratio of 1:0.3.
Figure 17:
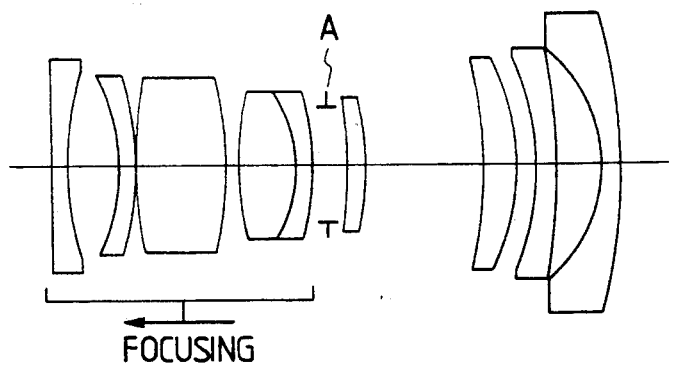
FIG. 17 is a simplified cross-sectional view of the lens system of Example 6, including a diaphragm stop A, for an object-to-image distance of 1 m after focusing by moving only the front subgroup 1F.
Figure 18A:
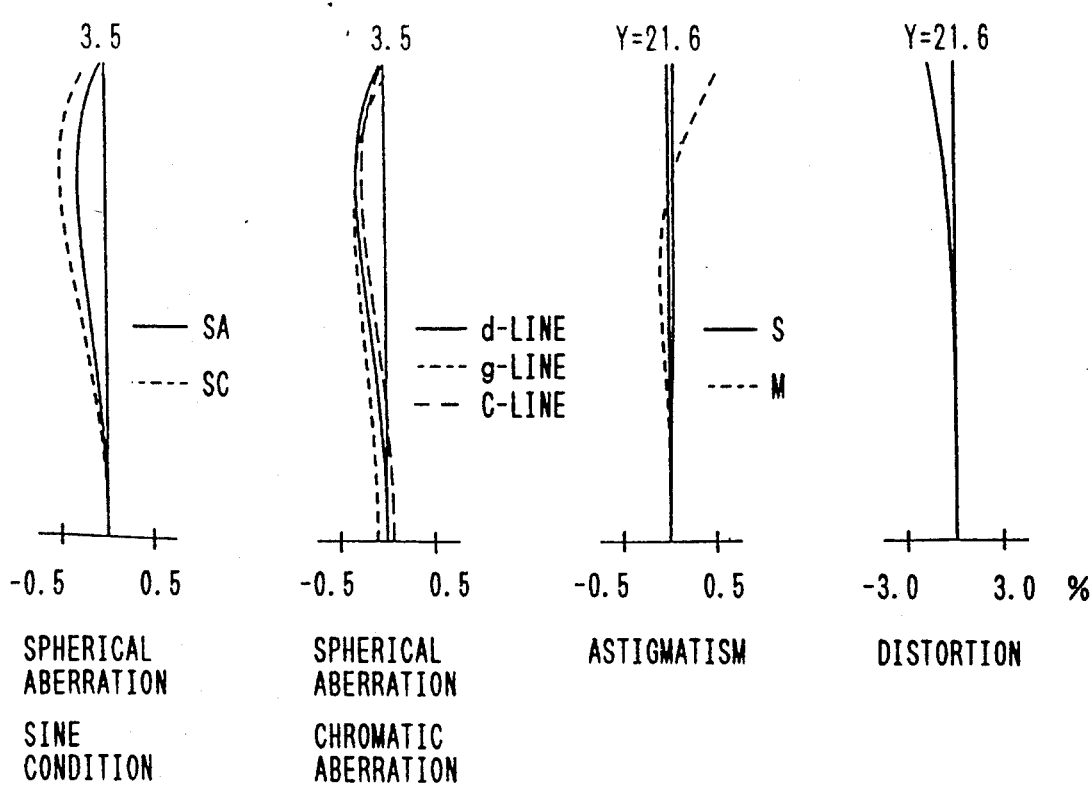
FIGS. 18a, 18b and 18c are graphs plotting the aberration curves obtained with the lens system shown in FIG. 17, with (a) showing the state at the wide-angle end, (b), the middle-angle end, and (c), the narrow-angle end.
Figure 18B:
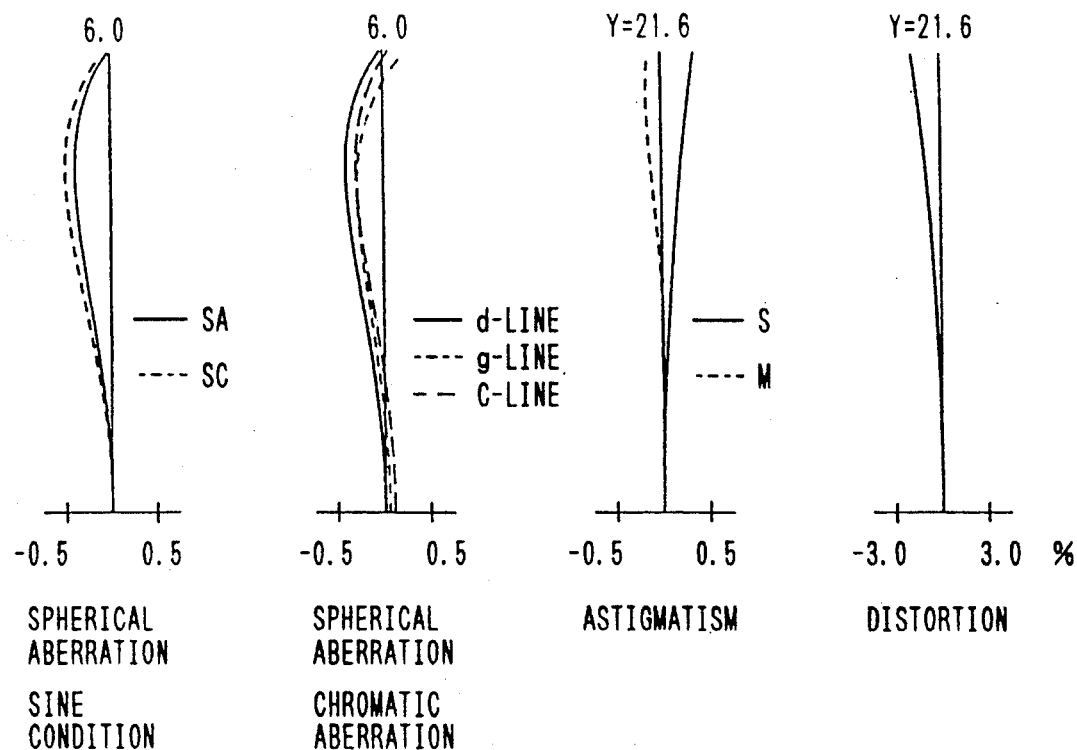
Figure 18C:
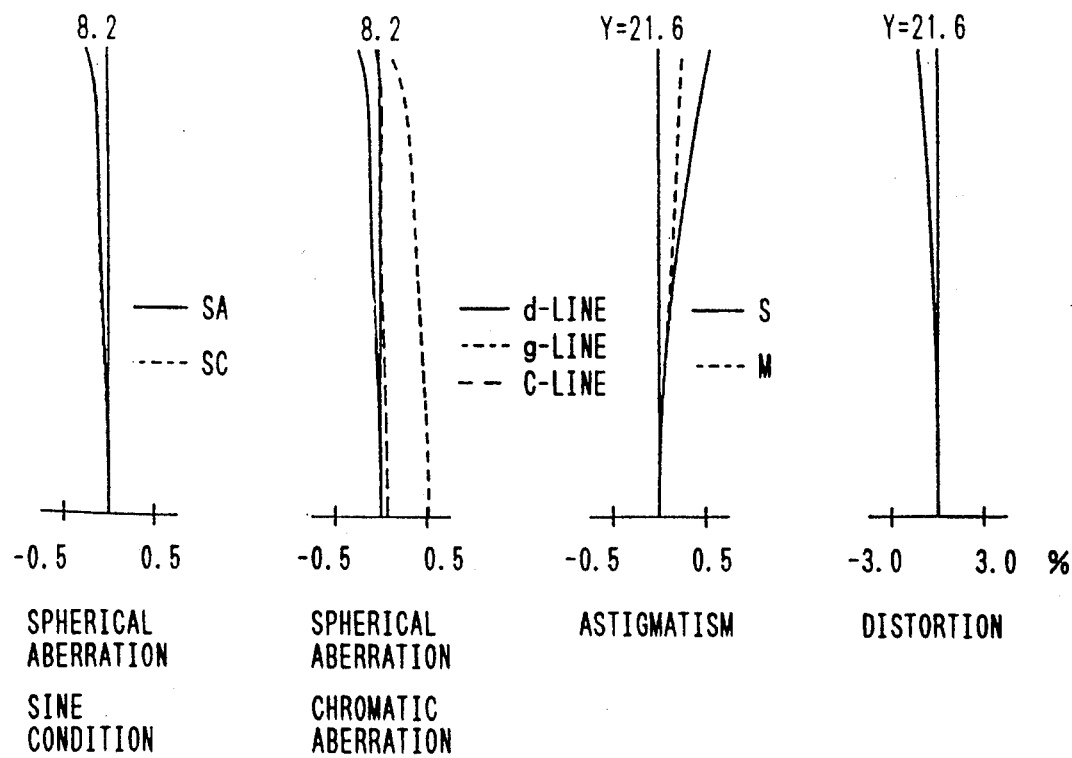
Figure 19:
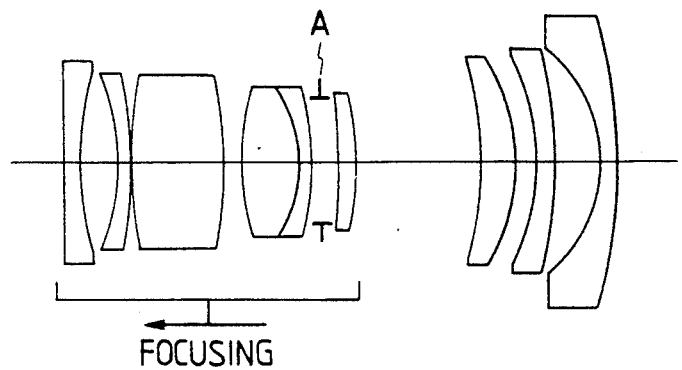
FIG. 19 is a simplified cross-sectional view of the lens system of Example 5, including a diaphragm stop A, for an object-to-image distance of 1 m after focusing by moving the first lens group en masse.
Figure 20A:
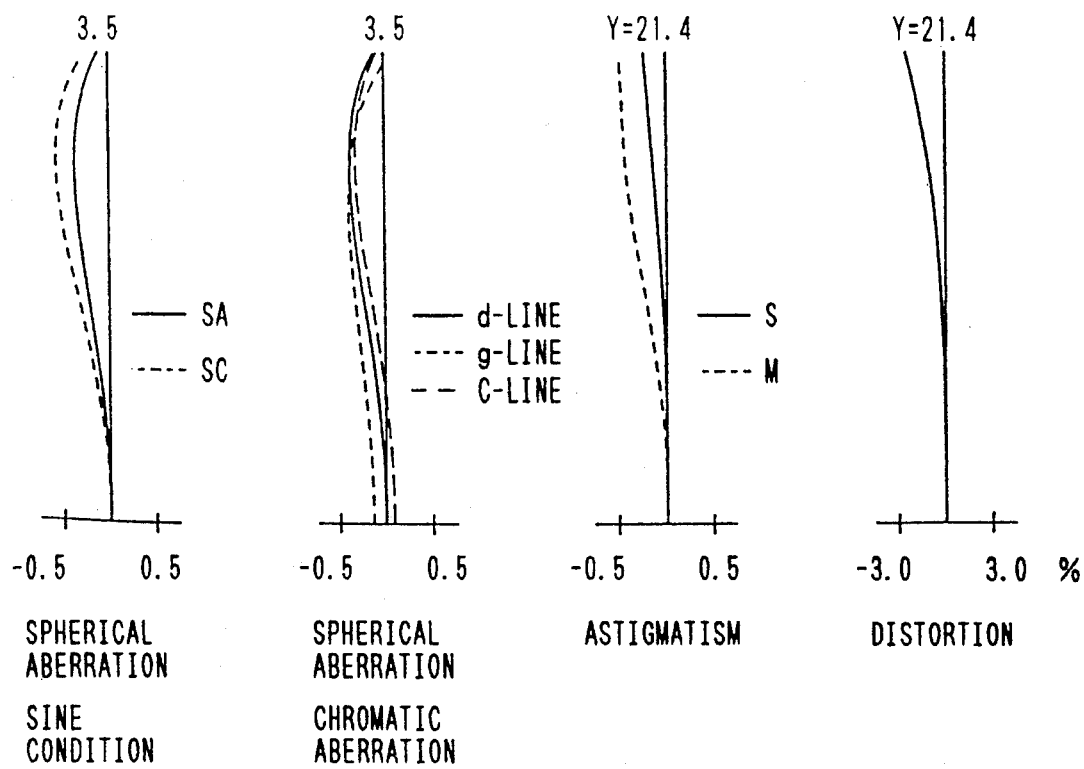
FIGS. 20a, 20b and 20c are graphs plotting the aberration curves obtained with the lens system shown in FIG. 19, with (a) showing the state at the wide-angle end, (b), the middle-angle end, and (c), the narrow-angle end.
Figure 20B:
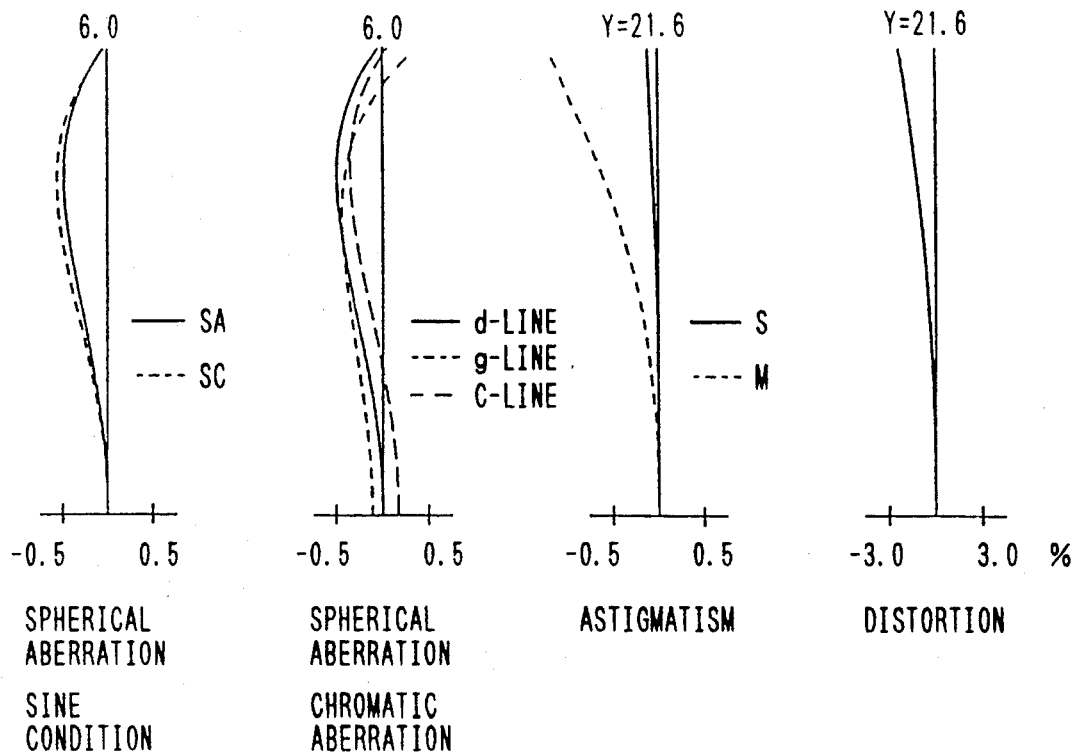
Figure 20C:
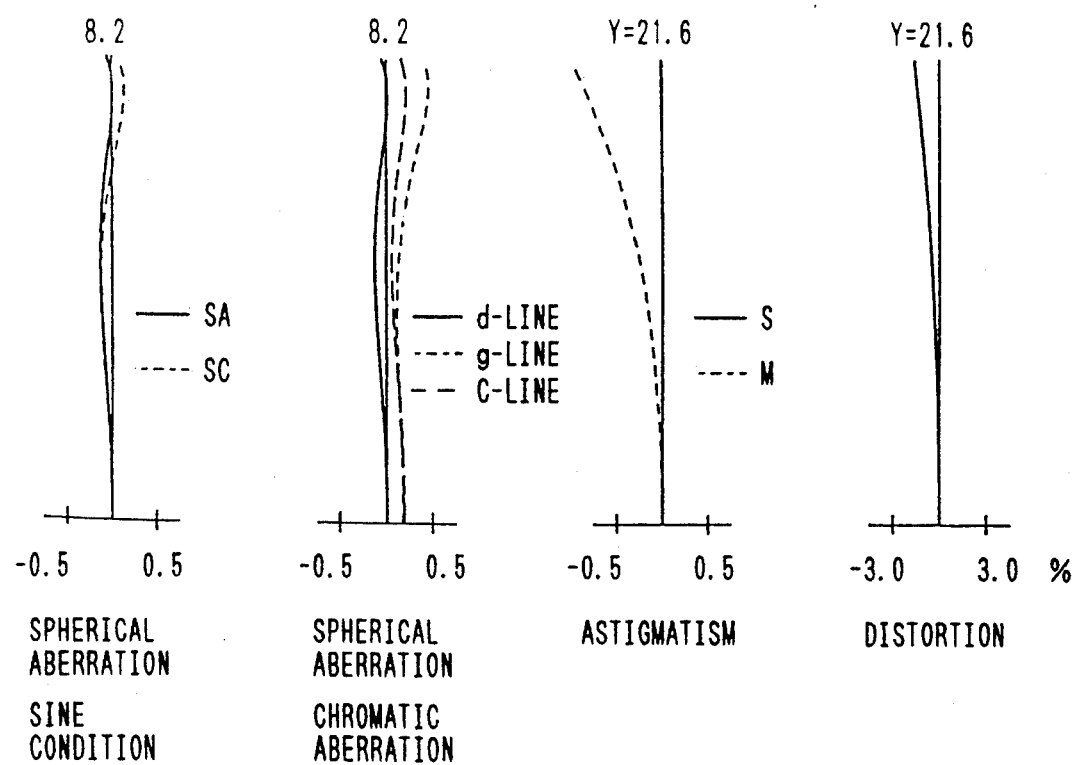
Figure 21:
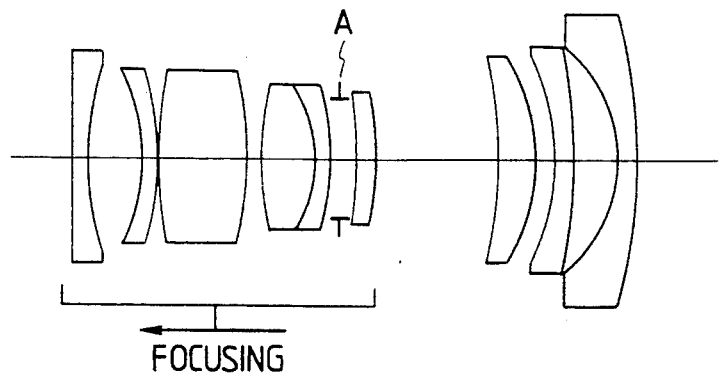
FIG. 21 is a simplified cross-sectional view of the lens system of Example 6, including a diaphragm stop A, for an object-to-image distance of 1 m after focusing by moving the first lens group en masse.
Figure 22A:
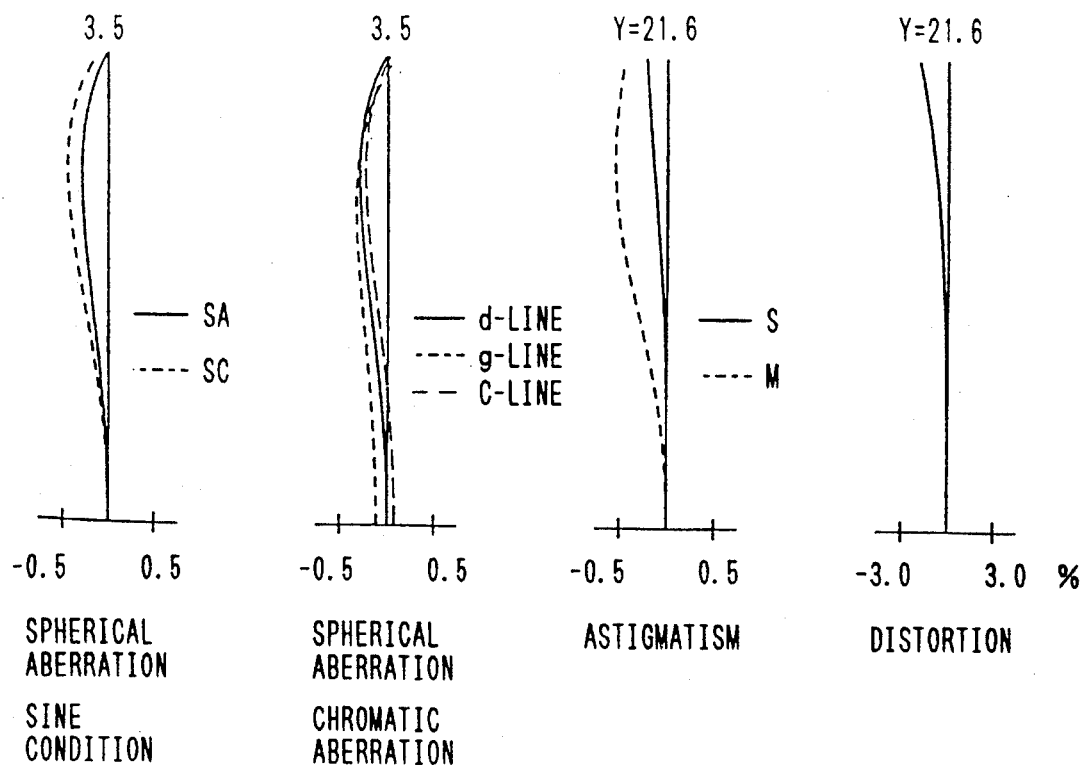
FIGS. 22a, 22b and 22c are graphs plotting the aberration curves obtained with the lens system shown in FIG. 21, with (a) showing the state at the wide-angle end, (b), the middle-angle end, and (c), the narrow-angle end.
Figure 22B:
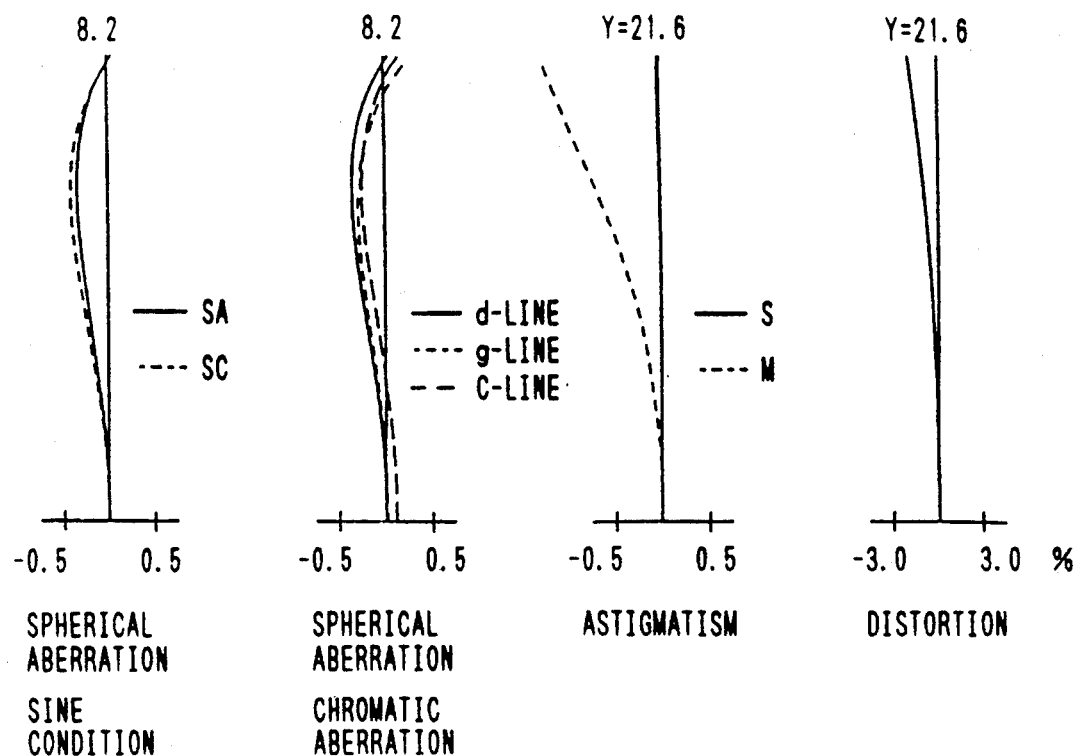
Figure 22C:
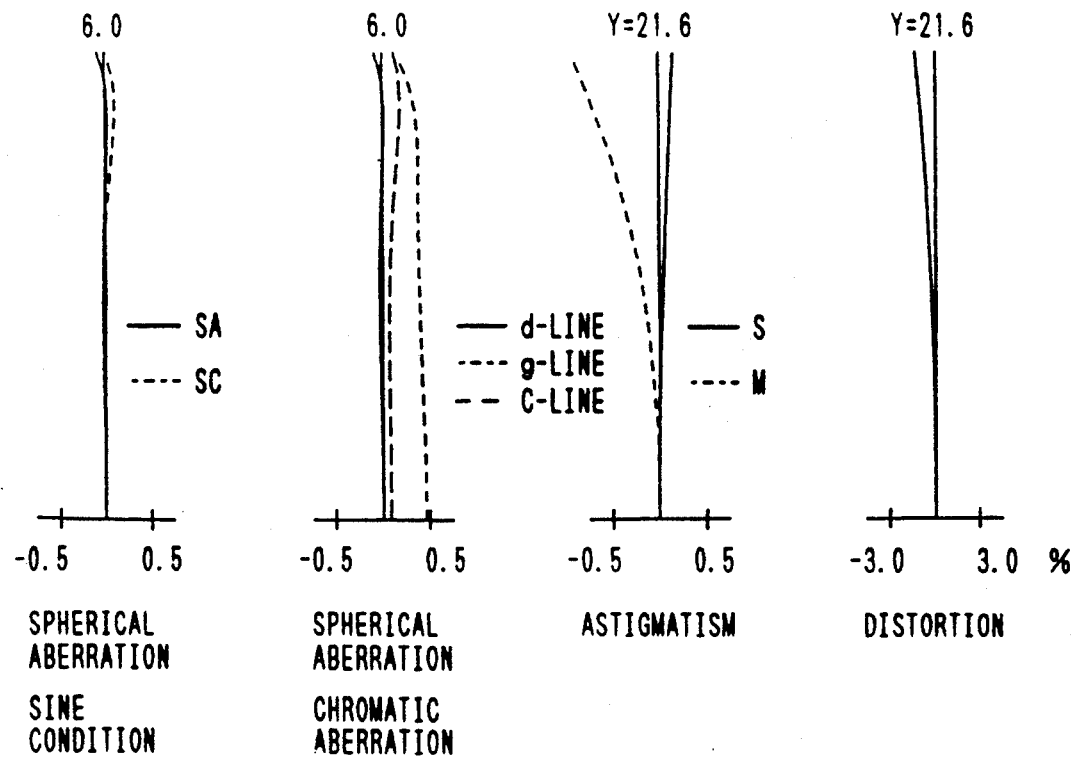

FIGS. 11 and 17 are simplified cross-sectional views of the lens systems of Examples 5 and 6, respectively, for the case where focusing is achieved by moving only the front lens group 1F. FIG. 13 is a simplified cross-sectional view of the lens system of Example 1 for the case where the front subgroup 1F and the rear subgrou 1R are moved for focuisng in a ratio of 1:0.3.

EXAMPLE 5

$F_{NO} = 1:3.5 \sim 6.0 \sim 8.2$  $f = 28.90 \sim 50.00 \sim 68.00$
$\omega = 37.9 \sim 24.0 \sim 18.0°$  $f_B = 8.50 \sim 30.15 \sim 48.61$

| Surface No. | r | d | N | ν |
|---|---|---|---|---|
| 1 | −150.930 | 1.20 | 1.73077 | 40.5 |
| 2* | 30.579 | 2.81 | | |
| 3 | −17.266 | 1.10 | 1.83481 | 42.7 |
| 4 | −35.533 | 0.20 | | |
| 5 | .43.230 | 6.90 | 1.68893 | 31.1 |
| 6 | −34.060 | 1.39 | | |
| 7 | 20.054 | 4.17 | 1.48749 | 70.2 |
| 8 | −11.261 | 1.20 | 1.84666 | 23.8 |
| 9 | −18.100 | 2.00 | | |
| 10 | −47.706 | 1.35 | 1.49176 | 57.4 (plastic) |
| 11* | −24.144 | 9.05 ∼ 3.50 ∼ 1.49 | | |
| 12 | −28.017 | 2.63 | 1.80518 | 25.4 |
| 13 | −15.358 | 1.59 | | |
| 14 | −18.080 | 1.35 | 1.83481 | 42.7 |
| 15 | −40.859 | 3.57 | | |
| 16 | −11.044 | 1.40 | 1.80610 | 40.9 |
| 17 | −37.661 | | | |

| 2nd Surface: Aspherical | 11th Surface: Aspherical |
|---|---|
| $\alpha_4 = 0.53606109 \times 10^{-4}$ | $\alpha_4 = 0.31364516 \times 10^{-4}$ |
| $\alpha_6 = 0.67837264 \times 10^{-7}$ | $\alpha_6 = 0.40451026 \times 10^{-6}$ |
| $\alpha_8 = 0.78976837 \times 10^{-8}$ | $\alpha_8 = -0.53872249 \times 10^{-8}$ |

EXAMPLE 6

$F_{NO} = 1:3.5 \sim 6.0 \sim 8.2$  $f = 28.92 \sim 50.00 \sim 68.00$
$\omega = 37.7 \sim 23.9 \sim 17.9°$  $f_B = 8.51 \sim 29.90 \sim 48.17$

| Surface No. | r | d | N | ν |
|---|---|---|---|---|
| 1 | 1000.000 | 1.20 | 1.73077 | 40.5 |
| 2* | 25.825 | 4.21 | | |
| 3 | −14.363 | 1.10 | 1.83481 | 42.7 |
| 4 | −27.711 | 0.20 | | |
| 5 | 34.987 | 6.70 | 1.72047 | 34.7 |
| 6 | −30.577 | 1.16 | | |
| 7 | 23.491 | 4.02 | 1.48749 | 70.2 |
| 8 | −11.372 | 1.30 | 1.80518 | 25.4 |
| 9 | −20.576 | 2.03 | | |

-continued

| | $F_{NO} = 1:3.5 \sim 6.0 \sim 8.2$ | | $f = 28.92 \sim 50.00 \sim 68.00$ | |
|---|---|---|---|---|
| | $\omega = 37.7 \sim 23.9 \sim 17.9°$ | | $f_B = 8.51 \sim 29.90 \sim 48.17$ | |
| 10* | −41.988 | 1.35 | 1.49176 | 57.4 (plastic) |
| 11 | −21.682 | 9.04~3.50~1.49 | | |
| 12 | −31.728 | 2.69 | 1.80518 | 25.4 |
| 13 | −15.809 | 1.47 | | |
| 14 | −19.145 | 1.35 | 1.83400 | 37.2 |
| 15 | −49.397 | 3.48 | | |
| 16 | −11.168 | 1.40 | 1.79952 | 42.2 |
| 17 | −42.430 | | | |

| 2nd Surface: Aspherical | 10th Surface: Aspherical |
|---|---|
| $a_4 = 0.43771496 \times 10^{-4}$ | $a_4 = -0.36242524 \times 10^{-4}$ |
| $a_6 = 0.33409765 \times 10^{-8}$ | $a_6 = -0.28552038 \times 10^{-6}$ |
| $a_8 = 0.61517350 \times 10^{-8}$ | $a_8 = 0.38808464 \times 10^{-8}$ |

Show below are the values that are calculated for the foregoing conditions in each of Examples 5 and 6.

| Calculation Value Based on Conditions | | |
|---|---|---|
| Conditions | Ex. 5 | Ex. 6 |
| (1) | −0.55 | −0.53 |
| (15) | 0.197 | 0.217 |
| (3) | 1.50 | 1.49 |
| (16) | 0.069 | 0.070 |
| (17) | −1.05 | −1.10 |
| (18) | 0.74 | 0.69 |
| (7) | −7.7 | −6.2 |
| (19) | 0.59 | 0.70 |
| (20) | −5.2 | −6.4 |
| (13) | 1.820 | 1.817 |

What is claimed is:

1. In a zoom lens system for use with a compact camera having a wide coverage of angles that comprises, in order from the object side, a first lens group having a positive focal length and a second lens group having a negative focal length and which performs zooming by changing the distance between the first and second lens groups, the improvement wherein said first lens group comprises, in order from the object side, a subgroup 1a having a negative focal length, subgroup 1b having a positive focal length subgroup 1a includes in order from the object side, a negative first lens, a negative second lens and a positive third lens, with the following conditions being satisfied:

$$-0.8 < f_{1G}/f_1 < -0.1 \quad (1)$$

$$-1.5 < f_{1G}/f_{1,2} < -0.8 \quad (2)$$

$$1.2 < f_S/f_{1G} < 1.7 \quad (3)$$

where
$f_{1G}$: the focal length of the first lens group;
$f_1$: the focal length of the first lens;
$f_{1,2}$: the composite focal length of the first and second lens in the subgroup 1a; and
$f_S$: the focal length of the overall system at the wide-angle end.

2. A zoom lens system according to claim 1 wherein said subgroup 1a has a spherical surface having an aspheric amount of divergence relative to an paraxial radius of curvature, satisfying the following condition:

$$-20 < \Delta I_{1a} < 0 \quad (4)$$

where $\Delta I_{1a}$ is the change of a third order spherical aberration coefficient by spherical surface within said subgroup 1a.

3. A zoom lens system according to claim 1 wherein the first lens of the subgroup 1a is a negative lens having a large concave curvature toward the image side, the second lens of the subgroup 1a is a negative lens having a large concave curvature toward the object side, and the third lens of said subgroup 1a is a positive lens having a convex curvature toward the object side, said system further satisfying the following conditions:

$$-0.8 < f_{1G}/f_{1a} < 0 \quad (5)$$

$$0.7 < r_2 f_S < 1.2 \quad (6)$$

$$0.5 < |r_3|/f_S < 1.0 \ (r_3 < 0) \quad (7)$$

$$0.8 < r_5/f_S < 5.0 \quad (8)$$

$$0.07 < N_2 - N_3 \quad (9)$$

$$7 < \nu_2 - \nu_3 \quad (10)$$

where
$f_{1a}$: the focal length of the subgroup 1a;
$r_i$: the radius of curvature of an i-th lens surface from the object side;
$N_K$: the refractive index of a K-th lens at d-line; and
$\nu_K$: the Abbe number of the K-th lens.

4. A zoom lens system according to claim 1, wherein the subgroup 1b includes a positive cemented lens composed of a biconvex lens 1b-1 and a negative meniscus lens 1b-2, said cemented lens having a divergent surface on its cemented surface, the subgroup 1b further including a positive lens after said cemented lens.

5. A zoom lens system according to claim 4, wherein the lens 1b-3 is aspheric and made of plastic, meeting the following conditions:

$$0 < \frac{f_{1G}}{f_{1b-3}} < 0.3 \quad (11)$$

$$-30 < \Delta I_{1b-3} < 0 \quad (12)$$

where $f_{1b-3}$ is the focal length of the lens 1b-3 and $\Delta I_{1b-3}$ is the change of the third order spherical aberration coefficient by the spherical surface of the lens 1b-3.

6. A zoom lens system according to claim 1, wherein the second lens group comprises, in order from the object side, a positive meniscus lens having a convex surface directed toward the image and two negative lens elements each having a concave surface directed toward the object, with the following condition being satisfied:

$$1.7 < \overline{N_{2Gn}} \quad (13)$$

$\overline{N_{2Gn}}$: the average of the refractive indices at the d-line of the two negative lens elements in the second lens group.

7. A zoom lens system for use with a compact camera with a wide coverage of angles, comprising, in order from the object side, a first lens group having a positive focal length and a second lens group having a negative focal length and which performs zooming by changing the distance between the first and second lens groups, the improvement where in a diaphragm stop is disposed after the first lens group and a fixed stop is further disposed after the first-mentioned stop, said fixed stop is moved together with the first lens group in zooming and is fixed away from the first lens group in focussing, said lens system further satisfying the condition:

$$0.03 < \frac{d_X}{f_S} < 0.15 \tag{14}$$

where $d_x$ is the distance between the rear end of the first lens and the fixed stop, and $f_S$ is the focal length of the overall lens system at the wide-angle end.

8. In a zoom lens system for use with a compact camera having a wide coverage of angles that comprises, in order from the object side, a first lens group having a positive focal length and a second lens group having a negative focal length and which performs zooming by changing the distance between the first and second lens groups, the improvement wherein said first lens group comprises, in order from the object side, a front subgroup 1F having a positive focal length, a diaphragm stop and a positive rear subgroup 1R with a small power, and the first lens in the front subgroup 1F is a negative lens, with the following conditions being satisfied:

$$-0.8 < f_{1G}/f_1 < -0.1 \tag{1}$$

$$-0.5 < f_{1G}/f_{1R} < 0.35 \tag{15}$$

$$1.2 < f_S/f_{1G} < 1.7 \tag{3}$$

$$0.03 < d_{1F\text{-}1R}/f_S < 0.15 \tag{16}$$

where
- $f_{1G}$: the focal length of the first lens group;
- $f_1$: the focal length of the first lens;
- $f_{1R}$: the focal length of the rear subgroup 1R;
- $f_S$: the focal length of the overall system at the wide-angle end; and
- $d_{1F\text{-}1R}$: the distance between the subgroups 1F and 1R for an infinitely distant object.

9. A zoom lens system according to claim 8 wherein the front subgroup 1F comprises, in order from the object side, a first lens unit 1a composed of at least three lens elements including two negative lens elements (the first and second lenses) and a positive lens, and a second lens unit 1b having a strong positive power, with the following additional conditions being satisfied:

$$-1.5 < f_{1G}/f_{1,2} < -0.8 \tag{17}$$

$$0.6 < f_{1G}/f_{1b} < 0.9 \tag{18}$$

where
- $f_{1,2}$: the composite focal length of the first and second lenses; and
- $f_{1b}$: the focal distance of the second lens unit 1b.

10. A zoom lens system according to claim 9, wherein the first lens unit 1a comprises, in order from the object side, a negative first lens having a concave surface of a large curvature direct toward the image, a negative second lens having a concave surface of a large curvature directed toward the object, and a positive lens having a convex surface directed toward the object.

11. A zoom lens system according to claim 9, wherein the second lens unit 1b comprises a biconvex positive lens having a divergent cemented surface and a negative meniscus lens.

12. A zoom lens system according to claim 9, wherein the first lens unit 1a has at least one aspheric surface that has a divergent amount of asphericity with respect to a paraxial radius of curvature in such a way as to satisfy the following condition:

$$-20 < \Delta I_{1a} < 0 \tag{4}$$

where
- $\Delta I_{1a}$: amount of change in the coefficient of a third-order spherical aberration caused by the aspheric surface in the first lens unit 1a.

13. A zoom lens system for use with a compact camera having a wide coverage of angles that comprises, in order from the object side, a first lens group having a positive focal length and a second lens group having a negative focal length and which performs zooming by changing the distance between the first and second lens groups, the improvement wherein said first lens group comprises, in order from the object side, a front subgroup 1F having a positive focal length, a diaphragm stop and a positive rear subgroup 1R with a small power, and the rear subgroup 1R is solely composed of a single plastic positive meniscus lens element having a convex surface directed toward the image, with the following conditions being satisfied:

$$-0.5 < f_{1G}/f_{1R} < 0.35 \tag{15}$$

$$(m_{2L} - m_{1R} \cdot m_{2L})^2 < 0.8 \tag{19}$$

where
- $m_{2L}$: the lateral magnification of the second lens group at the narrow-angle end; and
- $m_{1R}$: the lateral magnification of the rear subgroup 1R.

14. A zoom lens system according to claim 13 wherein the rear subgroup 1R has a divergent amount of asphericity with respect to a paraxial radius of curvature in such a way as to satisfy the following condition:

$$-20 < \Delta I_{1R} < 0 \tag{20}$$

where
- $\Delta I_{1R}$: the amount of change in the coefficient of a third-order spherical aberration caused by the aspheric surface in the rear subgroup 1R.

15. A zoom lens system according to claim 13 wherein the second lens group comprise, in order from the object side a positive meniscus lens having a convex surface directed toward the image and two negative lens elements each having a concave surface directed toward the object, with the following condition being satisfied:

$$1.7 < N_{2Gn} \tag{13}$$

$N_{2Gn}$: the average of the refractive indices at the d-line of the two negative lens elements in the second lens group.

16. A method of focusing with a zoom lens system for use with a compact having a wide coverage of angles, which lens system comprises, in order from the object side, a first lens group having a positive focal length and a second lens group having a negative focal length and which performs zooming by changing the distance between the first and second lens group, the improvement wherein said first lens group comprises, in order from the object side, a front subgroup 1F having a positive focal length, a diaphragm stop and a positive rear subgroup 1R with a small power, and the first lens in the front subgroup 1F is negative lens, and focusing is achieved by moving the first lens group toward the object with the distance between the front subgroup 1F and the rear subgroup 1R being increased while satisfying the following conditions:

$$-0.8 < f_{1G}/f_1 < -0.1 \quad (1)$$

$$0.05 < f_{1G}/f_{1R} < 0.35 \quad (15)$$

$$0 \leq \frac{X_{1R}}{X_{1F}} < 0.7 \quad (21)$$

where
- $X_{1R}$: the amount of movement of the rear subgroup 1R during focusing; and
- $X_{1F}$: the amount of movement of front subgroup 1F during focusing.

17. A method of focusing according to claim 16 wherein focusing is performed with both the diaphragm stop and the rear subgroup 1R being fixed.

18. A method of focusing with a zoom lens system for use with a compact having a wide coverage of angles, which lens system comprises, in order from the object side, a first lens group having a positive focal length and a second lens group having a negative focal length and which performs zooming by changing the distance between the first and second lens groups, the improvement wherein said first lens group comprises, in order from the object side, a front subgroup 1F having a positive focal length, a diaphragm stop and a positive rear subgroup 1R being solely composed of a single plastic positive meniscus lens element having a convex surface directed toward the image, and focusing is achieved by moving the first lens group toward the object with the distance between the front subgroup 1F and the rear subgroup 1R being increased while satisfying the following conditions:

$$0.05 < f_{1G}/f_{1R} < 0.35 \quad (15)$$

$$(m_{2L} - m_{1R} \cdot m_{2L})^2 < 0.8 \quad (19)$$

$$0 \leq \frac{X_{1R}}{X_{1F}} < 0.7 \quad (11)$$

wherein $f_{1G}$ is the focal length of the first lens group, $f_{1R}$ is the focal length of the rear subgroup 1R, $m_{2L}$ is the lateral magnification of the second lens group at the narrow-angle end, $m_{1R}$ is the lateral magnification of the rear subgroup 1R, $X_{1R}$ is the amount of movement of the rear subgroup 1R during focussing, and $X_{1F}$ is the amount of movement of the front subgroup 1F during focusing.

19. A method of focusing according to claim 18 wherein focusing is performed with both the diaphragm stop and the rear subgroup 1R being fixed.

* * * * *